(12) United States Patent
Tanaka et al.

(10) Patent No.: US 7,907,850 B2
(45) Date of Patent: Mar. 15, 2011

(54) OPTICAL COMMUNICATION DEVICE AND QUANTUM KEY DISTRIBUTION SYSTEM USING THE SAME

(75) Inventors: Akihiro Tanaka, Tokyo (JP); Akio Tajima, Tokyo (JP); Seigo Takahashi, Tokyo (JP); Wakako Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 998 days.

(21) Appl. No.: 11/788,707

(22) Filed: Apr. 20, 2007

(65) Prior Publication Data

US 2007/0248362 A1 Oct. 25, 2007

(30) Foreign Application Priority Data

Apr. 20, 2006 (JP) ................. 2006-116713

(51) Int. Cl.
*H04B 10/00* (2006.01)
(52) U.S. Cl. ........ 398/141; 398/140; 380/255; 380/256; 380/278; 380/273
(58) Field of Classification Search .......... 398/182–191; 380/255, 256, 278, 283
See application file for complete search history.

(56) References Cited

U.S. PATENT DOCUMENTS

| | | | |
|---|---|---|---|
| 5,515,438 A | 5/1996 | Bennett et al. | |
| 5,953,421 A | 9/1999 | Townsend | |
| 6,188,768 B1 * | 2/2001 | Bethune et al. | 380/278 |
| 6,438,234 B1 * | 8/2002 | Gisin et al. | 380/256 |
| 7,023,601 B2 * | 4/2006 | McGhan et al. | 359/246 |
| 7,277,603 B1 * | 10/2007 | Roberts et al. | 385/1 |
| 7,321,734 B2 * | 1/2008 | Roberts et al. | 398/193 |

FOREIGN PATENT DOCUMENTS

EP 1 633 076 A1 3/2006

OTHER PUBLICATIONS

Griffin, R.A., et al., "10 Gb/s Optical Differential Quadrature Phase Shift Key (DQPSK) Transmission using GaAs/AlGaAs Integration," OFC 2002, PD-FD6.
S. Hayase et al., "Proposal of 8-State per Symbol (Binary ASK and QPSK) 30-Gbit/s Optical Modulation/Demodulation Scheme," ECOC 2003, Th.2.6.4.
Hwang, W.-Y., "Quantum Key Distribution with High Loss: Toward Global Secure Communication," Physical Review Letters, vol. 91, No. 5, 057901 (2003).
Bennett and Brassard, "Quantum Cryptography: Public Key Distribution and Coin Tossing," Proceedings of IEEE International Conference on Computers, Systems, and Signal Processing, Bangalore, India, Dec. 10-12, 1984, p. 175.

(Continued)

*Primary Examiner* — Agustin Bello
(74) *Attorney, Agent, or Firm* — Scully, Scott, Murphy & Presser, P.C.

(57) ABSTRACT

An optical communication apparatus that can perform stable intensity and phase modulation on an optical pulse at high speed is provided, as well as a quantum key distribution system using the apparatus. Using multilevel signals for the electric signals (RF1, RF2) to be applied to two arms of a two-electrode Mach-Zehnder modulator, phase modulation is performed on an optical pulse in accordance with the average of the levels of the signals (RF1, RF2), and intensity modulation is performed on the optical pulse in accordance with the voltage difference between the signals (RF1, RF2), whereby stable high-speed multilevel modulation can be realized. The cryptographic key generation rate in a decoy quantum key distribution system is enhanced.

30 Claims, 14 Drawing Sheets

OTHER PUBLICATIONS

Ohm, M., et al., "Quaternary Optical ASK-DPSK and Receivers With Direct Detection," IEEE Photonics Technology Letters, vol. 15, No. 1, p. 159-161, Jan. 2003.

Huttner, B., et al. "Quantum cryptography with coherent states," Physical Review A, vol. 51, No. 3, p. 1863-1869, Mar. 1995.

Zhao, Y., et al., "Experimental Decoy State Quantum Key Distribution Over 15 km," arXiv:quant-ph/0503192 v2, Mar. 25, 2005.

Nambu, Y., et al., "One-way Quantum Key Distribution System based on Planar Lightwave Circuits," quant-ph/0603041, Jpn. J. Appl. Phys., p. 1-23, published online Jun. 8, 2006.

\* cited by examiner

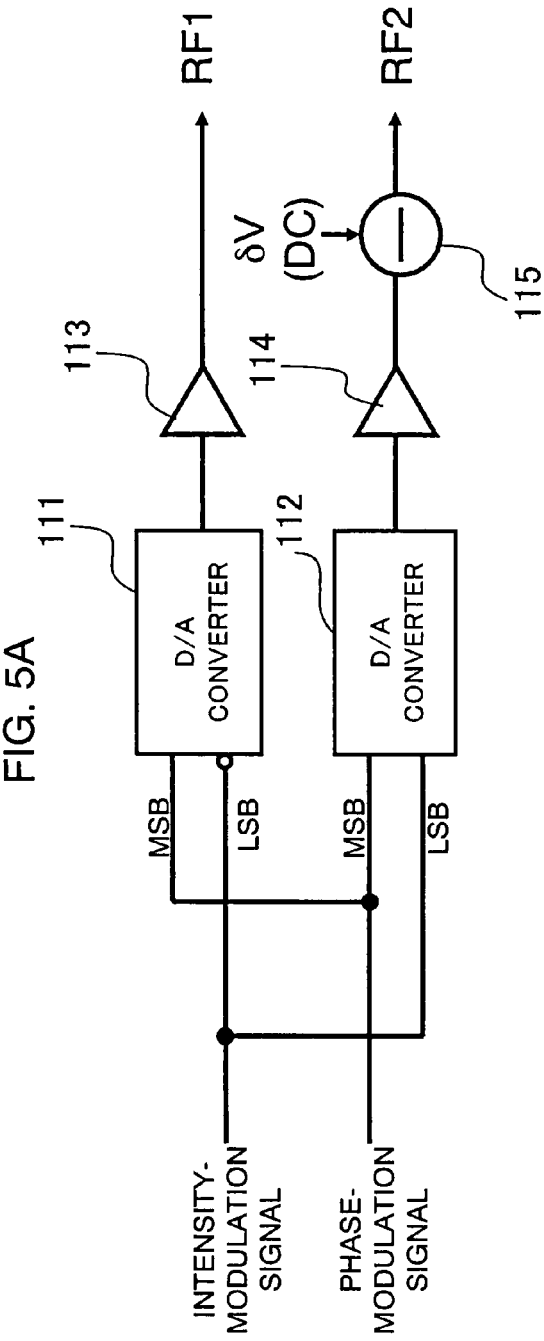

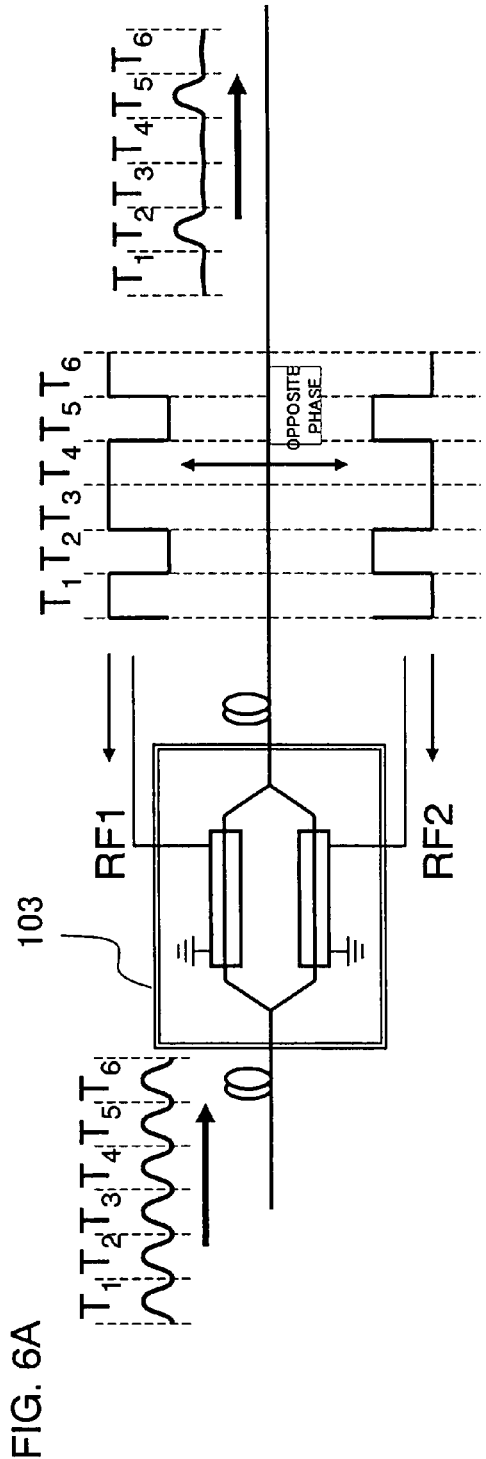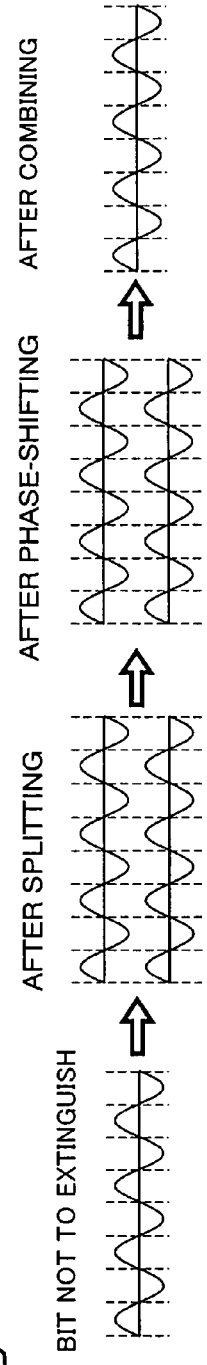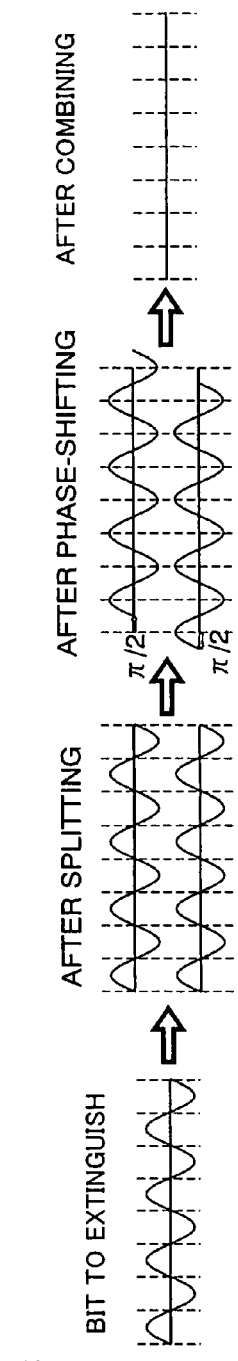
FIG. 6A
FIG. 6B
FIG. 6C

INTENSITY MODULATION

PHASE MODULATION

INTENSITY AND
PHASE CONTROL

OPTICAL COMMUNICATION DEVICE AND QUANTUM KEY DISTRIBUTION SYSTEM USING THE SAME

BACKGROUND OF THE INVENTION

1. Field of the Invention

The present invention relates to an optical communications system and, more particularly, to an optical communication apparatus that modulates the intensity and phase of an optical signal to be transmitted, as well as to a quantum key distribution system using the optical communication apparatus.

2. Description of the Related Art

In the present circumstances where the rapid growth in internet traffic continues, one of the most significant challenges is to enhance transmission bandwidth or transmission speed. This is no exceptional matter with trunk optical networks. Various research institutes and laboratories are working toward an increase in the data transmission speed per carrier in order to expand transmission capacities by utilizing the existing infrastructures without adding transmission lines and repeaters. Data transmission speeds continue to increase also in practical commercial transmission systems.

In general optical communication technologies, since binary amplitude shift keying (ASK) is principally used, a dominant approach to the enhancement of the transmission speed per carrier is to reduce the time slot per bit. However, since around the time the data transmission speed per carrier exceeded 10 Gb/s, it has been difficult to accomplish higher speed only by using ASK.

One of the reasons for this is deterioration in waveform due to wavelength dispersion, which is typical of optical transmission lines. The wavelength dispersion is a phenomenon such that a propagation delay occurring in a transmission line varies depending on the wavelength of signal light. Since a signal-light spectrum has a specific range of wavelengths, a short-wavelength component and a long-wavelength component of the same signal light accumulate different wavelength dispersion values during propagation. This accumulated dispersion after propagation results in a difference in propagation delay, that is, causes waveform distortion. On comparison using an ASK signal, since the signal-light spectrum changes in proportion to the modulation rate, the waveform distortion due to wavelength dispersion becomes greater proportionately as the data transmission speed rises. On the other hand, a time slot becomes shorter proportionately as the data transmission speed rises. Therefore, even if signals suffer the same waveform distortion (that is, signals have the same propagation-delay differences), a higher-speed signal is more affected. For the reasons above, it is said that in ASK, the propagation characteristics deteriorate in proportion to the square of the data transmission speed.

As described above, since it has been difficult to achieve higher speed only by using ASK, another approach is attracting attention, which is a technique for enhancing transmission bandwidth by using a multivalued signal with the increased number of signal states per time slot. For example, four-state modulation of the phase of light may be employed to enhance transmission bandwidth, which is described in Griffin, R. A., et al., "10 Gb/s Optical Differential Quadrature Phase Shift Key (DQPSK) Transmission using GaAs/AlGaAs Integration," OFC 2002, PD-FD6.

As another example, multiple digital bits per symbol (for a carrier and a time slot) may be employed by modulating both the intensity and phase of light (APSK: Amplitude Phase Shift Keying), which is described in the following papers:

S. Hayase et al. "Proposal of 8-State per Symbol (Binary ASK and QPSK) 30-Gbit/s Optical Modulation/Demodulation Scheme," ECOC 2003, Th.2.6.4; and Ohm, M., et al. "Quaternary Optical ASK-DPSK and Receivers With Direct Detection," IEEE Photonics Technology Letters, Vol. 15, No. 1, p. 159.

FIG. 1 is a block diagram showing a schematic configuration of a transmitter that generates an APSK signal, described in S. Hayase et al. A light source 1401 generates continuous wave (CW) light, which is subjected at a first-stage Mach-Zehnder (MZ) modulator 1402 to binary phase shift keying (PSK) with two phases of 0 and $\pi$, and is subsequently subjected at a second-stage phase modulator 1403 to binary PSK with two phases of 0 and $\pi/2$. Thereby, a PSK signal having four states of 0, $\pi/2$, $\pi$, and $3\pi/2$ can be obtained. Further, a MZ modulator 1404 performs two-level modulation also in the intensity direction on the four-state PSK signal, thereby generating an eight-state (3 bits/symbol) APSK signal. Furthermore, in this example, a MZ modulator 1405 is also used to return to zero (RZ) each bit.

However, a multivalued signal such as the APSK signal has an increased number of states per symbol on the one hand, but has a reduced distance between signal points on I-Q plane on the other hand. Therefore, if an attempt is made to obtain the same code error rate as that achieved by a binary modulation scheme such as ASK or BPSK, a large carrier-to-noise ratio (CNR) is needed.

However, the use of modulators at multiple stages in generating an APSK signal, as in the transmitter of S. Hayase et al., increases loss and therefore reduces the intensity of output light, that is, the power of carrier. Here, although the intensity of transmitted light can be set high by using an optical amplifier, it is impossible to avoid degradation of the signal-to-nose ratio (SNR) at the time of signal transmission. Incidentally, U.S. Pat. No. 7,023,601 discloses a structure that realizes a single MZ modulator in place of multistage-connected modulators.

In addition, quantum key distribution (QKD) technology can be included in the list of technologies employing such a modulation scheme of modulating both the intensity and phase of an optical signal. In QKD, photons are generally used as a communication medium, and information is transmitted by superposing it on the quantum states of a single photon. An eavesdropper present on a transmission line can intercept the information by tapping photons being transmitted, or any other strategy. However, according to the Heisenberg's uncertainty principle, it is impossible to perfectly return a once-observed photon to the quantum state before observation. Therefore, a change occurs in the statistics of the reception data detected by an authorized receiver. By detecting this change, the receiver can detect the presence of an eavesdropper on the transmission line.

In the case of QKD utilizing the phase modulation of a photon, a sender and a receiver (hereinafter, referred to as Alice and Bob, respectively) constitute an optical interferometer, and Alice and Bob randomly perform phase modulation on each photon independently from each other. An output of "1" or "0" can be obtained depending on the difference between the depths of these phase modulations. Thereafter, Alice and Bob check against each other part of the conditions they used when measuring the output data, whereby Alice and Bob can ultimately share the same bit string.

However, in the case of implementing QKD in the real world, for lack of useful single-photon light sources, an alternative method is used in which the light intensity of an optical pulse generated by a laser diode (LD) for general communication is lowered to a single-photon level (weak coherent state) by using an optical attenuator. Therefore, the possibility remains that one pulse might include two photons or more, which works in favor of an eavesdropper. If an eavesdropping strategy called photon number splitting (PNS), described in Huttner, B., et al. "Quantum cryptography with coherent states," Physical Review A, Vol. 51, No. 3, P. 1863, is used in particular, an eavesdropper can intercept the information on a bit with 100% certainty when one pulse corresponding to this bit includes two photons or more.

A measure for defending this PNS attack has been suggested. According to a QKD method employing a decoy state protocol disclosed in Hwang, W.-Y., "Quantum Key Distribution with High Loss: Toward Global Secure Communication," Physical Review Letters, Vol. 91, No. 5, 057901 (2003), the intensity of each optical pulse is intentionally changed to any one of a signal-state intensity and a decoy-state intensity. Thereby, even if weak coherent light is used, since the mean number of photons per bit is intentionally changed beforehand, it is possible to monitor a change in the statistics of the number of received photons, which occurs when a PNS attack is present. Accordingly, it is possible to effectively prevent the PNS attack. A report on an experiment of QKD utilizing this technique is described in Zhao, Y., et al., "Experimental Decoy State Quantum Key Distribution Over 15 km," quant-ph/0503192.

FIG. 2 is a block diagram showing a schematic configuration of a two-way QKD system described in Zhao et al. Here, Alice (sender/transmitter) 1510 and Bob (receiver) 1520 are connected through optical fiber 1530. An optical pulse in a multi-photon state is generated by a light source 1521 in Bob 1520 and sent to Alice 1510. The optical pulse arriving from Bob 1520 is detected by a photo detector (not shown) before the pulse enters a storage-use optical fiber 1513 in Alice 1510, and the result of this detection is notified to a variable optical attenuator 1514. The arriving optical pulse, after passing through the storage-use optical fiber 1513 and a phase modulator 1512, is reflected by a Faraday mirror 1511. The reflected optical pulse is phase-modulated ($\phi$A) by the phase modulator 1512 and then returns to the variable optical attenuator 1514 after passing through the storage-use optical fiber 1513.

Since the variable optical attenuator 1514 has been notified of the timing of the arrival of the optical pulse from the photo detector, the variable optical attenuator 1514 is driven at the timing when this optical pulse is returned by the Faraday mirror 1511, whereby the mean number of photons per optical pulse can be controlled. The mean number of photons per optical pulse is intentionally changed by using the variable optical attenuator 1514 in this manner, and then the optical pulse is sent to Bob 1520. Accordingly, by monitoring a change in the statistics of the number of received photons, Bob 1520 can detect the presence or absence of a PNS attack.

In such a decoy-state QKD system, however, a sender (Alice) in the conventional decoy-state QKD technology cannot perform both phase modulation and intensity modulation on each optical pulse at high speed with high reliability.

For example, in the decoy-state QKD system described in Zhao et al., the variable optical attenuator is disposed on the sender side (Alice) of the two-way QKD system, that is, at the returning end, whereby the mean number of photons per pulse is set. However, there are no variable optical attenuators that can operate at high speeds in the gigahertz range or so while ensuring the amount of attenuation for each of the polarization axes with accuracy. Therefore, the operable optical pulse repetition rate has a limit, resulting in a limit being imposed on the cryptographic key generation rate.

Additionally, in the two-way system described in Zhao et al., backscattered light of an optical pulse occurring on the outward journey (mainly due to Rayleigh scattering with non-changing wavelength) degrades the characteristics of the system as noise light. This noise can be ignored if the intensity of signal light is strong enough in comparison with the intensity of this backscattered noise light. However, since the signal light suffers optical loss inside the sender (Alice), the signal light might be lost in the backscattered noise light in an extreme case. To avoid the degradation of the characteristics of the system due to the backscattered noise light, it is necessary to make the optical loss inside the sender as small as possible. Therefore, it is important that as a small number of optical components as possible be used in the sender.

However, as shown in FIG. 2, the two-way system described in Zhao et al. has the configuration in which an optical pulse generated in the receiver (Bob) undergoes a round trip along the optical transmission line: going to the sender (Alice), returned there, and then coming back to the receiver (Bob). According to this configuration, inside the sender (Alice), which is the returning end, the optical pulse passes twice (on the outward and return journeys) through the optical components such as the variable optical attenuator, storage-use optical fiber, and phase modulator. Therefore, the optical loss inside the sender is large.

Moreover, in the case where the variable optical attenuator is provided in addition to the phase modulator, it is necessary to vary the timings when a train of optical pulses pass through these two devices in the outward and return journeys. Therefore, a timing design is difficult to make, and there arises a limit to the QKD system driving rate.

SUMMARY OF THE INVENTION

Accordingly, an object of the present invention is to provide an optical communication apparatus and a quantum key distribution system that can perform stable intensity and phase modulation on an optical pulse at high speed.

Another object of the present invention is to provide an optical communication apparatus and a quantum key distribution system that can enhance the cryptographic key generation rate.

An optical communication device according to the present invention includes: an optical modulator having an interferometer structure which includes a plurality of optical waveguides and electrodes provided each corresponding to the waveguides, wherein the optical modulator allows both phase and intensity of each optical pulse to be modulated at the same time according to driving signals each applied to the electrodes; and a driver for driving the optical modulator by generating the driving signals from modulation information for separately modulating the phase and the intensity of the optical pulse, wherein the optical modulator modulates the intensity of each optical pulse, which is one of a plurality of intensity levels including a very weak level.

Preferably, the intensity of each optical pulse is randomly changed depending on the modulation information modulating the intensity of the optical pulse. According to a mode of the present invention, the driver generates the driving signals according to first information which causes the phase of each optical pulse to be modulated and second information which causes the intensity of the optical pulse to be modulated, wherein the first information is multi-valued information corresponding to a plurality of phases and the second information is multi-valued information corresponding to a plurality of intensities. The driver can set an intensity ratio for intensity modulation by offset adjustment of at lease one of the driving signals.

According to an embodiment of the present invention, the optical communication device further includes a loop-back is section for receiving the optical pulse from the other optical communication device and returning it to the other communication device, wherein the optical modulator is provided at a predetermined position on an optical path in the loop-back section. For example, the loop-back section may include a Faraday mirror or a polarization beam splitter loop.

In the case of the loop-back section including a polarization beam splitter loop, the optical modulator is preferably provided on an optical path of the loop-back section. Since the optical pulse is returned through the polarization beam splitter and the optical modulator, the optical loss can be reduced.

In a preferable embodiment of the present invention, the optical modulator is a dual-electrode Mach-Zehnder modulator. More specifically, the driver includes: a first digital-to-analog converter for generating a first modulation signal from binary phase-modulation information inputted as MSB (Most Significant Bit) and inverted one of binary intensity modulation information inputted as LSB (Least Significant Bit); a second digital-to-analog converter for generating a second modulation signal from the binary phase-modulation information inputted as MSB (Most Significant Bit) and the binary intensity modulation information inputted as LSB (Least Significant Bit); a first amplifier for amplifying the first modulation signal; a second amplifier for amplifying the second modulation signal; and an adder for adding a predetermined offset signal to an output signal of the second amplifier. In this case, an output signal of the first amplifier is applied as a first driving signal to one electrode of the dual-electrode Mach-Zehnder modulator and an output signal of the adder is applied as a second driving signal to the other electrode of the dual-electrode Mach-Zehnder modulator. The first and second amplifiers preferably amplify the first and second modulation signals respectively so that a voltage difference between adjacent levels of the output signals of the first and second amplifiers becomes equal to a level that is half a driving voltage $V_\pi$ of the dual-electrode Mach-Zehnder modulator. specifically, the predetermined offset signal allows the output signal of the second amplifier to deviate from half the driving voltage $V_\pi$ by a predetermined voltage.

According to another aspect of the present invention, in an optical communication device for sequentially transmitting optical pulses to another optical communication device by using an optical modulator having an interferometer structure which includes a plurality of optical waveguides and electrodes provided each corresponding to the waveguides to modulate the optical pulses in both phase and intensity, driving signals are generated from modulation information for separately modulating the phase and the intensity of the optical pulse; and the driving signals are applied to the electrodes of the optical modulator so as to modulate both phase and intensity of each optical pulse at the same time. The driving signals are generated such that a plurality of intensity levels among which the optical modulator modulates the intensity of each optical pulse includes a very weak level.

According to still another aspect of the present invention, a quantum key distribution system for sharing a string of random numbers between a sender and a receiver while changing a mean number of photons transmitted from the sender to the receiver, wherein the sender includes: an optical modulator having an interferometer structure which includes a plurality of optical waveguides and electrodes provided each corresponding to the waveguides, wherein the optical modulator allows both phase and the mean number of photons of each optical pulse to be modulated at the same time according to driving signals each applied to the electrodes; and a driver for driving the optical modulator by generating the driving signals from modulation information for separately modulating the phase and the mean number of photons of the optical pulse. The modulation information may be a string of random numbers and the optical modulator modulates the mean number of photons of each optical pulse, which is one of a plurality of mean numbers of photons including a very small number of photons for a very weak level.

As described above, phase modulation and intensity modulation can be concurrently performed by driving a single optical modulator according to modulation information. Accordingly, a smaller number of optics components can be used, resulting in reduced optical loss due to the optics through which an transmission optical pulse is transmitted. Accordingly, deterioration in the intensity of a transmitted optical pulse can be effectively suppressed. Specifically, when a Mach-Zehnder modulator is used as the optical modulator, it operates at much higher speed and the phase change can be also set more accurately, compared to a variable optical attenuator, resulting in stable intensity and phase modulation on an optical pulse at high speed.

In the case where the present invention is applied to a decoy QKD system in which the mean number of photons is varied, phase modulation and intensity modulation can be concurrently performed by driving a single optical modulator, allowing the timing design to be greatly simplified and the cryptographic key generation rate to be significantly enhanced. In addition, since a small number of optics components through which a transmission optical pulse is transmitted can be used, the cryptographic key generation rate due to the operable band of optics in use can be dramatically improved.

BRIEF DESCRIPTION OF THE DRAWINGS

FIG. 5A is a block diagram showing a signal processing system in an AM/PM MZ modulator driver.

FIG. 5B is a table showing the levels of signals relating to the signal processing system.

FIG. 6A is a schematic diagram showing a general method of using a MZ modulator.

FIG. 6B is an explanatory diagram showing waveforms in the case where no extinction is performed.

FIG. 6C is an explanatory diagram showing waveforms in the case where extinction is performed.

DETAILED DESCRIPTION OF THE PREFERRED EMBODIMENTS

1. Mode for Carrying Out the Invention

1.1) System Configuration

Figure 3:
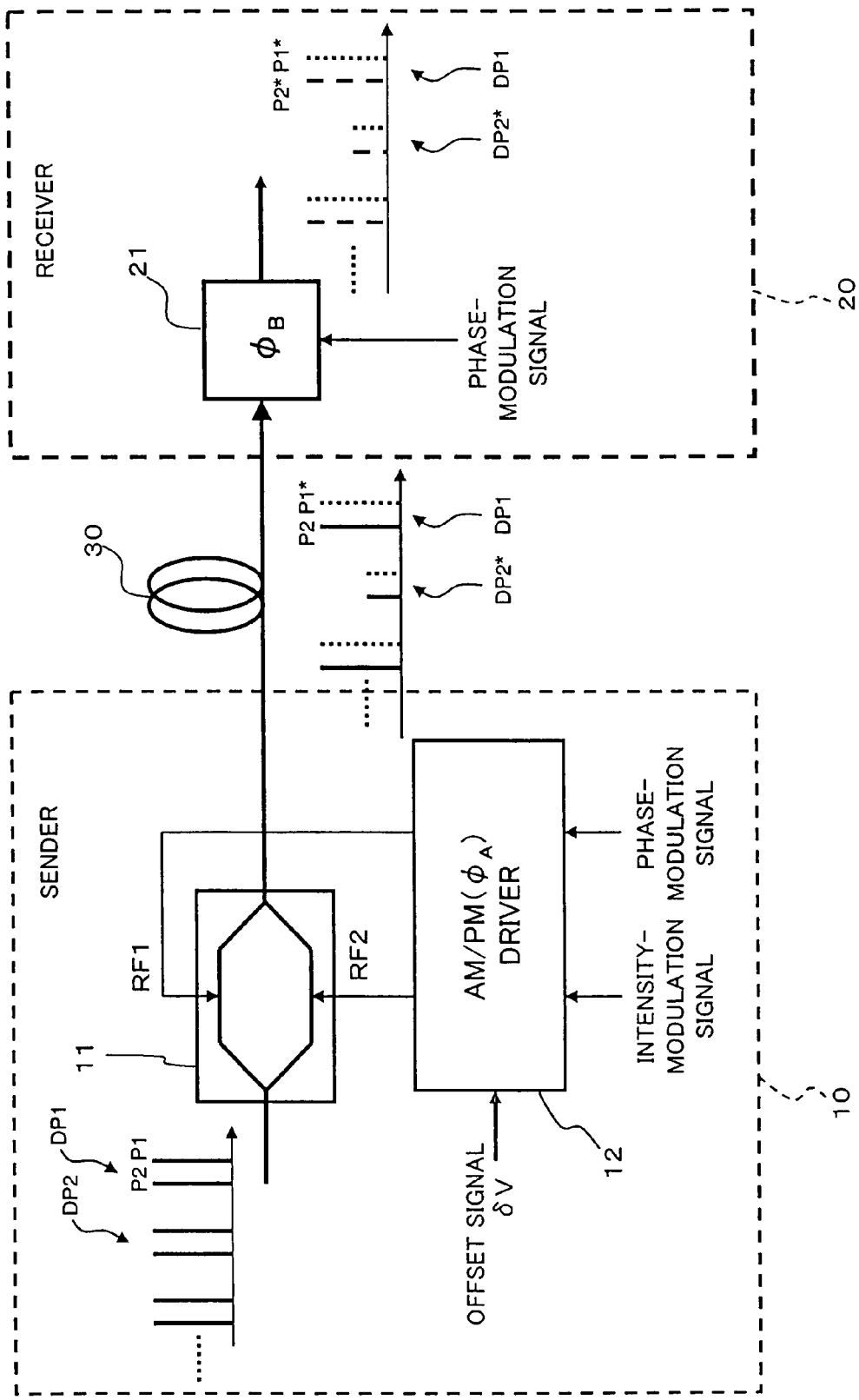
FIG. 3 is a block diagram showing a schematic configuration of an optical communications system according to a mode of the present invention.

FIG. 3 is a block diagram showing a schematic configuration of an optical communications system according to a mode of the present invention. Here, it is assumed that a sender (Alice) 10 and a receiver (Bob) 20 are connected through an optical fiber 30.

The sender 10 is basically provided with a dual-electrode Mach-Zehnder (MZ) modulator (hereinafter, simply referred to as MZ modulator) 11 and a MZ modulator MZ modulator driver 12 for driving the MZ modulator 11. The MZ modulator 11 used here is a dual-electrode, MZ-type, LN (LiNbO$_3$) modulator which is generally available. By controlling driving voltages RF1 and RF2 applied to the MZ modulator 11, the MZ modulator 11 can perform both or one of intensity modulation and phase modulation ($\phi$A) on an optical pulse, which will be described later.

The MZ modulator driver 12 receives an intensity-modulation signal and a phase-modulation signal as inputs from a controller (not shown) and generates the driving voltages RF1 and RF2. Additionally, the MZ modulator driver 12 is offset-adjustable with an offset signal $\delta$V. In this mode, the intensity ratio in intensity modulation is set by using the offset signal $\delta$V.

The receiver 20 is provided with a phase modulator 21 that performs phase modulation ($\phi$B) on an optical pulse received from the sender 10. The receiver 20 can detect information (1/0) depending on the value of a difference ($\phi$A–$\phi$B) between the phase modulation depth ($\phi$A) given at the sender 10 and the phase modulation depth ($\phi$B) given at the receiver 20.

1.2) Operation

As shown in FIG. 3, a single optical pulse is split into a double pulse DP composed of two time-divided pulses P1 and P2, and a train of such double pulses DP1, DP2, ... are passed through the MZ modulator 11 of the sender 10. At the timing of each of these pulses, the MZ modulator driver 12 applies the driving voltages RF1 and RF2 to the two electrodes of the MZ modulator 11 respectively according to the intensity-modulation and phase-modulation signals. Thereby, the MZ modulator 11 concurrently performs intensity modulation and phase modulation on each pulse of a double pulse DP (for details, see Section 1.4). In the intensity modulation, the intensity of an optical pulse is changed at multiple levels in accordance with the intensity-modulation signal. These multiple levels include a very weak light level at which an optical pulse contains about a few photons on average. In the phase modulation, the phase of an optical pulse is changed over multiple phases in accordance with the phase-modulation signal. In the case of two phases, the phase is changed to any one of, for example, 0 and $\pi$. In the case of four phases, the phase is changed to any one of, for example, 0, $\pi/2$, $\pi$, and 3$\pi/2$.

In the example shown in FIG. 3, when subjected to intensity and phase modulation at the MZ modulator 11, the double pulse DP1 is intensity-modulated to a high intensity, and the first (preceding) pulse P1 thereof is phase-modulated ($\phi$A). The subsequent double pulse DP2 is intensity-modulated to a low intensity, and the first pulse P1 thereof is phase-modulated ($\phi$A). When a train of such double pulses arrive at the receiver 20 through the optical fiber 30, the phase modulator 21 of the receiver 20 phase-modulates ($\phi$B), for example, each second (following) pulse P2 in accordance with a phase-modulation signal. In this manner, information can be detected for each double pulse from the phase difference between the first pulse P1 and the second pulse P2 thereof. Further, based on the intensity randomly varying with each double pulse, it is possible to monitor a change in the statistics of the number of received photons, which occurs when a PNS attack is present. Accordingly, it is possible to effectively prevent the PNS attack.

1.3) Advantages

As described above, according to the present mode, the single MZ modulator 11 is driven with the driving voltages according to the intensity-modulation signal and the phase-modulation signal. The MZ modulator 11 can operate at far higher speed than a variable optical attenuator or the like and can set the amount of phase change with accuracy. Therefore, it is possible to perform intensity modulation and phase modulation on an optical pulse at high speed with accuracy. In addition, since the number of optics components that a transmitted optical pulse passes through is reduced, it is possible to make the optical loss smaller. Accordingly it is possible to effectively suppress the degradation of the intensity of a transmitted optical pulse.

Since intensity and phase modulation can be realized by using a single MZ modulator, the timing design can be greatly simplified particularly in the case of applying the present mode to a decoy QKD system in which the mean number of photons is varied. Accordingly, it is possible to significantly enhance the cryptographic key generation rate.

1.4) MZ Modulator

To describe the intensity and phase modulation by the MZ modulator, a method of generating an APSK-RZ signal that has four states (two values for intensity and two values for phase) per symbol (i.e., one symbol representing two bits) will be described as an example.

Figure 4:
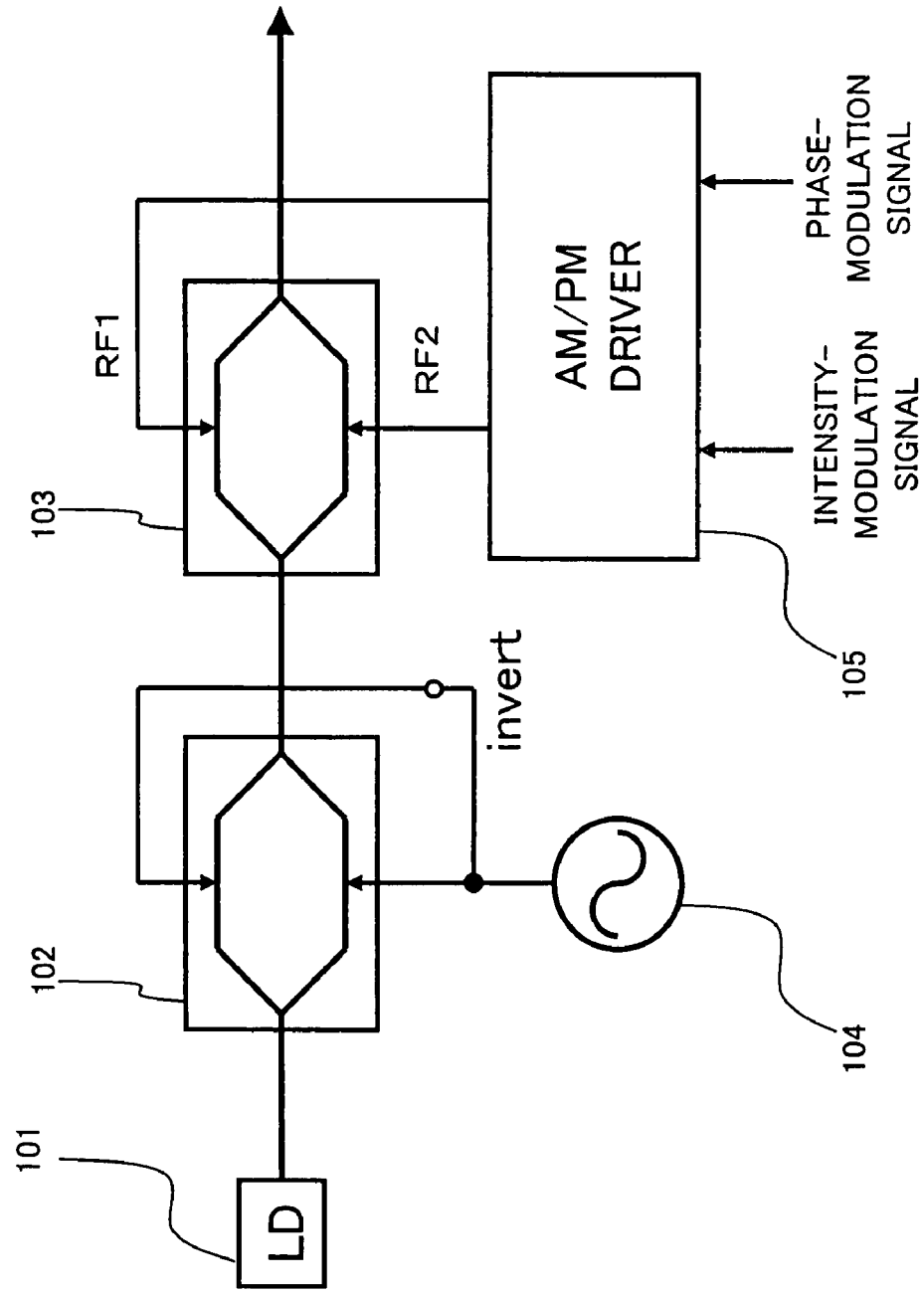
FIG. 4 is a block diagram showing an intensity and phase modulator using Mach-Zehnder (MZ) modulators.

FIG. 4 is a block diagram showing an intensity and phase modulator using MZ modulators. CW light outputted from a laser light source 101 is first subjected to return-to-zero (RZ) modulation at a dual-electrode MZ modulator 102. The MZ modulator 102 is driven in accordance with a clock signal supplied from a clock source 104. The RZ signal generated here is further subjected to APSK modulation at a dual-electrode MZ modulator 103. The MZ modulator 103 is driven in accordance with driving signals RF1 and RF2 for APSK modulation. An AM/PM MZ modulator driver 105 generates the driving signal RF1 and RF2 from an intensity-modulation signal and a phase-modulation signal.

FIG. 5A is a block diagram showing a signal processing system inside the AM/PM MZ modulator driver, and FIG. 5B is a table showing the levels of signals relating to the signal processing system. Each of the intensity-modulation signal and phase-modulation signal inputted into the driver 105 is split into two lines, which are led into two-bit digital-to-analog (D/A) converters 111 and 112, which generate two lines of four-value signals. In this case, the phase-modulation signal is inputted to each MSB (Most Significant Bit) of the D/A converters 111 and 112, and the intensity-modulation signal is inputted to each LSB (Least Significant Bit) of the D/A converters 111 and 112. For the D/A converter 111 on the RF1 side, the inverted intensity-modulation signal is inputted to the LSB. RF signals outputted from the D/A converters 111 and 112 are amplified by amplifiers 113 and 114, respectively. The amplifiers 113 and 114 amplify the respective RF signals until the difference between adjacent levels of the four-value signals becomes equal to half the value of $V_\pi$, a voltage relating to the MZ modulator. Note that $V_\pi$ is a voltage for allowing the MZ modulator to effect a $\pi$ phase modulation. Further, for an output of the amplifier 114 on the RF2 side, an adder 115 gives a DC offset of $-\delta V$ to the signal level.

By virtue of the driver 105 having such a circuitry, it is possible to obtain multilevel intensity signals having levels as shown in the table of FIG. 5B. For example, when the intensity-modulation signal is "1" and the phase-modulation signal is "0", since the values inputted to the MSB and LSB of the D/A converter 111 on the RF1 side are both "0", the output of the D/A converter 111 is "0" (V). Since the values inputted to the MSB and LSB of the D/A converter 112 on the RF2 side are "0" and "1" respectively, the output of the D/A converter 112 is "1" (V). Accordingly, the output of the amplifier 113 on the RF1 side is "0" (V), and the output of the amplifier 114 on the RF2 side is "$V_\pi/2$" (V). Since the output on the RF2 side is given a DC offset of "$-\delta V$", the final output on the RF1 side is "0"(V), and the final output on the RF2 side is "$V_\pi/2-\delta V$" (V). In the cases of the other combinations, ultimate values for the driving signals RF1 and RF2 can be obtained similarly.

1.4.1) Extinction Operation

Next, the extinction operation of the MZ modulator will be described, assuming that $\delta V=V_\pi/2$ for simplicity.

FIG. 6A is a schematic diagram showing a general method of using the MZ modulator, FIG. 6B is an explanatory diagram showing waveforms in the case where light is not extinguished, and FIG. 6C is an explanatory diagram showing waveforms in the case where light is extinguished.

Referring to FIG. 6A, it is assumed that a RZ-modulated optical signal is inputted into the MZ modulator 103 from the left of the drawing. Here, inputted are optical pulses equivalent to six bits (passing through the modulator 103 at times T1 to T6 respectively). The MZ modulator 103 receives as inputs two lines of RF signals RF1 and RF2, thereby performing modulation. In the MZ modulator 103, a driving voltage of $V_\pi$ required to extinguish the input light can be reduced by half to a driving voltage of $V_\pi/2$ by bringing the RF signals RF1 and RF2 in opposite phase.

FIGS. 6B and 6C show the mechanism of extinction by a Mach-Zehnder (MZ) interferometer. In the MZ interferometer, at the input end, an input stream of light pulses is split into two pulse streams traveling through two arms, respectively. When traveling through the two arms, each pair of light pulses of the two pulse streams are shifted in phase and then combined at the output end. The amplitude of the combined light pulse is determined depending on the relative phase shift amount between two corresponding phase-shifted light pulses. For a bit not to extinguish, phase shifting is performed in the arms so that the resulting relative phase shift amount becomes $2N\pi$ (N is an integer). On the other hand, for a bit to extinguish, the phase of the light in one of the arms is shifted to $(+\pi/2+2N\pi)$, and the phase of the light in the other arm is shifted to $(-\pi/2+2M\pi)$ (M is an integer), whereby the two streams of light after passing through the respective arms have a relative phase difference of $(\pi+2(N+M)\pi)$. Since two waves thus having a phase difference of $(\pi+$(an integral multiple of $2\pi$)) cancel out each other when they are combined, the output of the MZ interferometer is extinguished.

In the example shown in FIG. 6A, the relative biases of the RF signals RF1 and RF2 are controlled so that no extinction takes place at the times T2 and T5 and extinction takes place at the other times T1, T3, T4, and T6. Accordingly, the input light is transmitted to produce output light only at the times T2 and T5.

1.4.2) Intensity and Phase Modulation

Next, the intensity and phase modulation operation of the MZ modulator will be described, assuming that $\delta V=V_\pi/2\pm\alpha$. As described below, the intensity ratio in intensity modulation can be set by determining the value of $\alpha$.

Figure 7A:
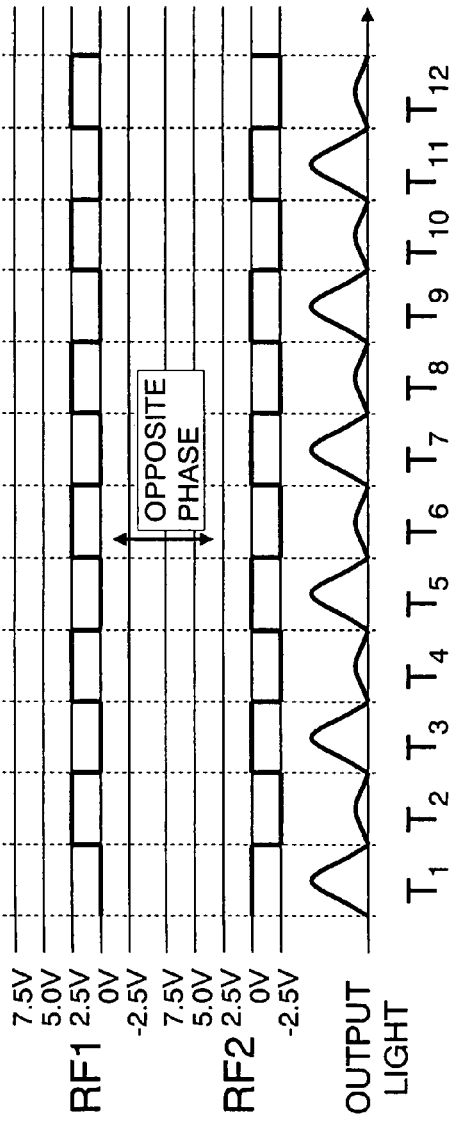
FIG. 7A is a waveform diagram for describing the intensity modulation operation of the MZ modulator.
Figure 7B:
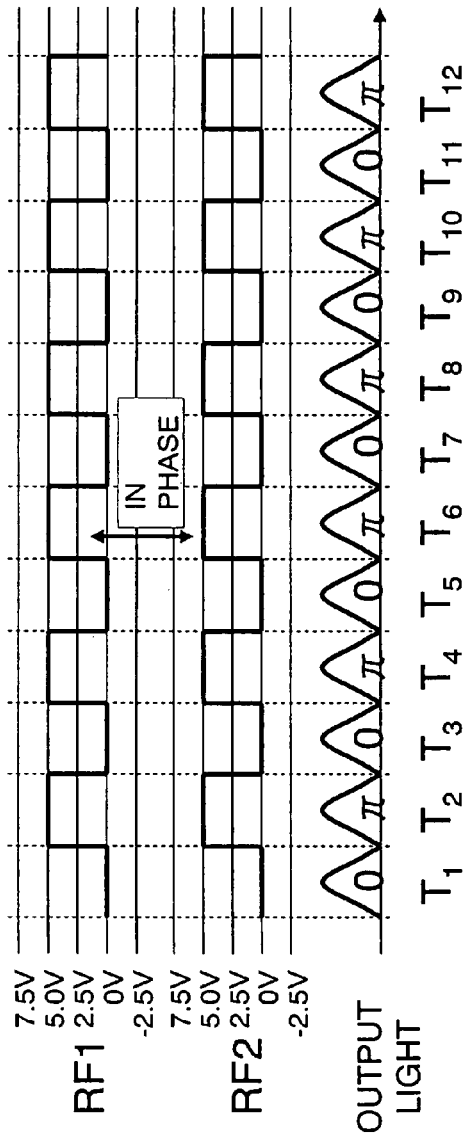
FIG. 7B is a waveform diagram for describing the phase modulation operation of the MZ modulator.
Figure 8:
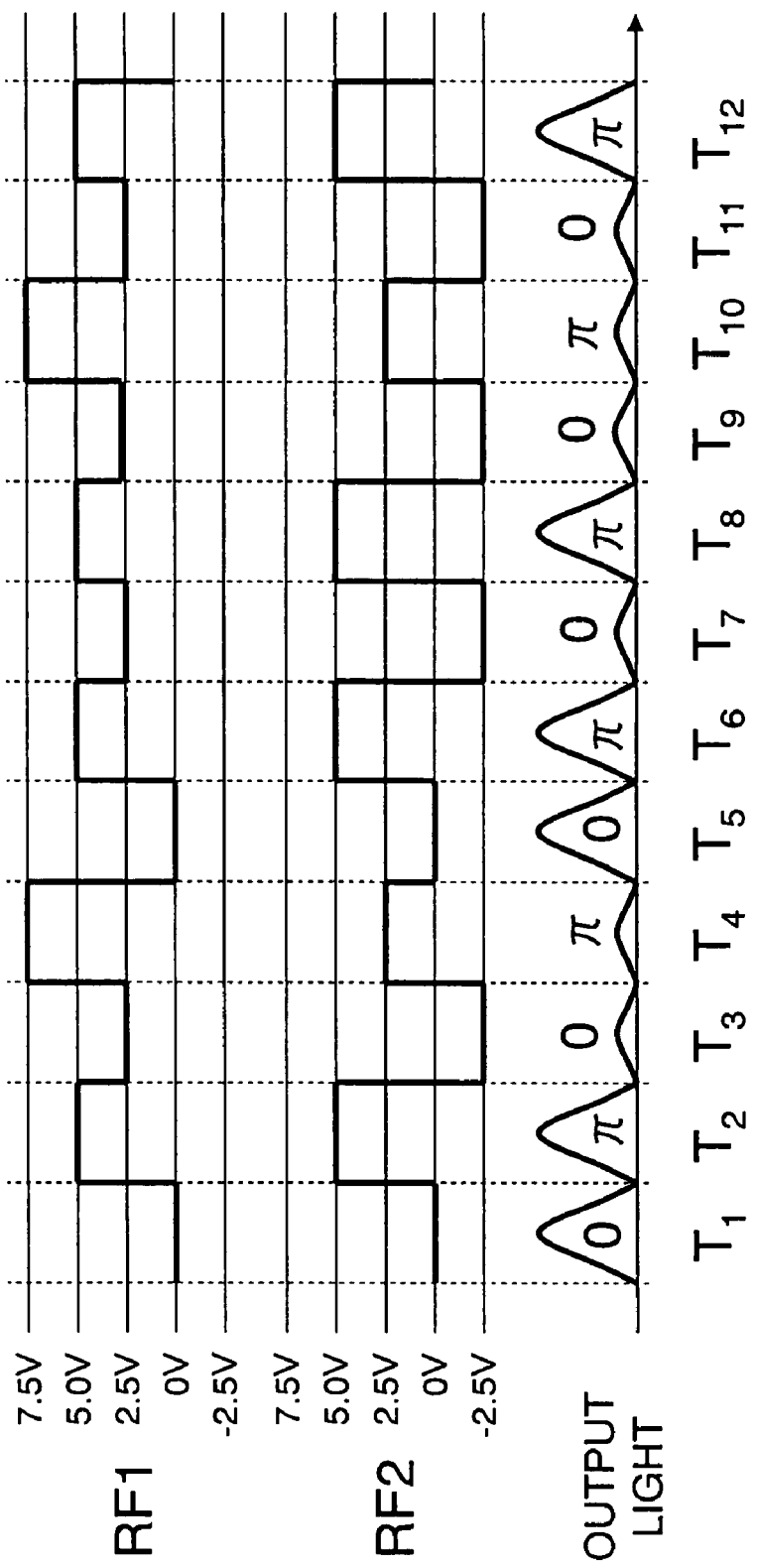
FIG. 8 is a waveform diagram for describing the intensity plus phase modulation operation of the MZ modulator.

FIG. 7A is a waveform diagram for describing the intensity modulation operation of the MZ modulator, and FIG. 7B is a waveform diagram for describing the phase modulation operation of the MZ modulator. FIG. 8 is a waveform diagram for describing the intensity and phase modulation operation of the MZ modulator. In FIGS. 7A, 7B and 8, to simplify the description, the waveforms of the signal RF2 is those when $\delta V$ (offset)=$V_\pi/2$, that is, the waveforms before the value of $\alpha$ is given. In addition, the waveforms of the output light show as examples the states of a modulated optical signal when the amplitudes of the signals RF1 and RF2 and the value of the offset, $\delta V$, are varied. It is assumed that the driving voltage $V_\pi$ for the MZ modulator=5 V, that the intensity of light transmitted through the MZ modulator is maximized when the difference between the voltages applied to the two arms is 0 V, and that the phase of output light is 0 when a voltage of 0 V is applied to each of the two arms.

As shown in FIG. 7A, in the case where the signals RF1 and RF2 vary in opposite phase and the voltage of the signal RF1 alternates between 0 (V) and $+V_\pi/2$ (V) and the voltage of the signal RF2 alternates between 0 (V) and $-V_\pi/2$ (V), the intensity of output light is lowered (but not extinguished because of $\alpha$) when the voltage difference is equal to $V_\pi$(=5 V), based on the principle described in FIGS. 6A to 6C.

As shown in FIG. 7B, in the case where the same amounts of phase shift are given to the two arms, it can be seen that the intensity is not lowered but the phase of output light only is changed. In other words, the output phase is shifted by $\pi$ by applying a voltage of $V_\pi$, which is 5 V here, to each of the two arms.

Accordingly, as shown in FIG. 8, by controlling the values of voltages to be applied to the two arms of the MZ modulator, it is possible to perform phase modulation and intensity modulation at the same time. Specifically, the bit at the time T1 (RF1=RF2=0(V)) comes out as described at T1 in FIGS. 7A and 7B; the bit at the time T2 (RF1=RF2=5(V)) comes out as described at T2 in FIG. 7B; the bit at the time T3 (RF1=2.5 (V), RF2=−2.5(V)) comes out as described at T2 in FIG. 7A.

Here, consideration will be given of the bit at the time T4. In this case, the application voltage of the signal RF1 is 7.5 V ($3V_\pi/2$) and the application voltage of the signal RF2 is 2.5 V ($+V_\pi/2$). Therefore, the phase difference is $\pi$, resulting in the intensity of output light being lowered. However, this residual light that is not completely extinguished has an output phase of $\pi$. This is because the modulation voltages applied to the two arms can be considered to be $\pm 2.5$ V ($V_\pi/2$) respectively with the center voltage at +5.0 V ($V_\pi$).

Generalizing the foregoing, it can be understood that the average of the voltages of the modulation signals applied to the two arms designates a modulation phase, and that the relative difference between the voltages of the modulation signals designates a modulation intensity.

As described above, the MZ modulator 103 is driven with two multilevel signals, and the voltage difference between the two signals, |RF1−RF2|, and the offset, δV, are appropriately set, whereby the intensity modulation and phase modulation of light can be performed at the same time. If this is applied to the operation of the AM/PM MZ modulator driver shown in FIGS. 5A and 5B, the following results are obtained. When the intensity-modulation signal and phase-modulation signal are both "0", that is (0, 0), the same output as the bit at the time T3 in FIG. 8 can be obtained. Similarly, when the intensity-modulation signal and phase-modulation signal are "1" and "0", respectively, that is (1, 0), the same output as the bit at the time T1 can be obtained; when (0, 1), the same output as the bit at the time T4 can be obtained; and when (1, 1), the same output as the bit at the time T2 can be obtained.

In the above description, it is set that $\delta V = V_\pi/2 \pm \alpha (\alpha \neq 0)$, whereby the optical intensity at the lower one of the two intensity levels is not completely extinguished in order to accomplish APSK based on four states per symbol. This is because a phase signal needs to be read even in the case of the lower-intensity optical level. That is, the DC voltage (δV) that is displaced from $V_\pi/2$ by α is applied to the adder (or subtracter) 115 so that the light will not be completely extinguished even when the intensity-modulation signal is "0". Thereby, it is possible to generate an APSK-RZ signal having four states (two values for intensity and two values for phase) per symbol. Note, however, that if the DC voltage to be applied to the adder 115 is displaced too far from $V_\pi/2$, the optical intensity becomes small when the intensity-modulation signal is "1".

As described above, by setting α at an appropriate value, it is possible to set the intensity ratio in intensity modulation at a desired value. For example, giving consideration to the fact that the transmission curve of a MZ modulation is a squared sinusoidal function curve, two intensity levels with a 1:3 intensity ratio can be set by setting $\alpha = V_\pi/6$, that is, $\delta V = V_\pi/3 (= V_\pi/2 - V_\pi/6)$. Accordingly, in decoy QKD for example, such output pulses of different intensities can be used as a signal-state pulse and a decoy-state pulse.

As mentioned above, two modulators are used in the present mode: the MZ modulators 102 and 103. The fact that a small number of modulators are used makes a difference in the performance of a transmission system because of the optical loss in the modulators, not to mention the costs. Since catalog values for the insertion loss of a general LN modulator are approximately 5 dB, there is a difference of approximately 10 dB in loss in comparison with, for example, the scheme using four modulators as described in Hayase et al. Because of this, it can be calculated, based on the fact that single mode fiber (SMF), which is used for general transmission lines, exhibits a loss of −0.2 dB/km, that the transmittable distances differ by 50 km in the case where the transmittable distance in a transmission system without repeater is determined depending on a loss limit.

On the other hand, even if the intensity of transmitted light is raised by using an optical amplifier, the transmittable distance still decreases because a noise caused by the optical amplifier degrades the optical SNR.

Note that although the above description is given of the method in which each bit is RZ-modulated and then APSK-encoded with four values, the present mode can also be applied to the case of using a non-return-to zero (NRZ) signal and to other multilevel coding that uses a larger number of levels. Further, although D/A converters are used in the present mode to generate the electrical multilevel signals RF1 and RF2, analog operational device and the like may also be used as alternative means to generate electrical multilevel signals. Furthermore, the DC bias (δV) to be applied at the final stage does not need to be $V_\pi/3$ (V) but may be set depending on a desired set value of optical intensity.

2. First Embodiment

2.1) System Configuration

Figure 9:
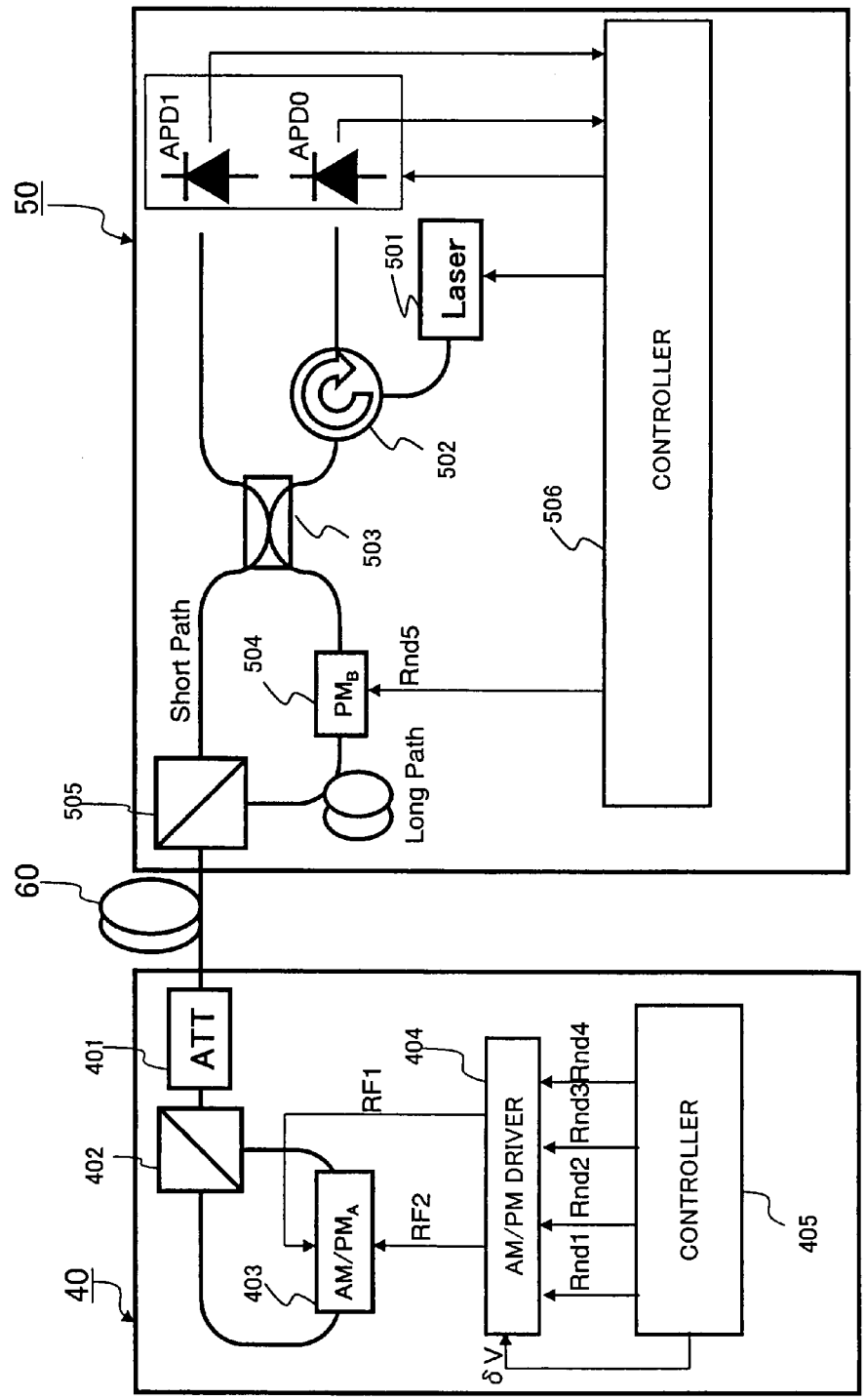
FIG. 9 is a block diagram showing a configuration of a two-way QKD system according to a first embodiment of the present invention.

FIG. 9 is a block diagram showing a configuration of a two-way quantum key distribution (QKD) system according to a first embodiment of the present invention. Here, it is assumed that a sender (Alice) 40 and a receiver (Bob) 50 are connected through an optical fiber transmission line 60.

First, an optical pulse outputted from a laser light source 501 in the receiver 50 is sent to an optical coupler 503 by a circulator 502 and split into two pulses by the optical coupler 503. One of the two optical pulses is directly sent to a polarization beam splitter 505, allowed to pass through it, and then sent out to the transmission line 60. The other optical pulse is allowed through a phase modulator 504, sent to the polarization beam splitter 505, reflected there, and then sent out to the transmission line 60. The two optical pulses can be made to arrive at the polarization beam splitter 505 at different times by giving a difference between these two paths (short path and long path). Accordingly, when the polarization beam splitter 505 combines the two sent optical pulses and sends them out to the transmission line 60, the two pulses are multiplexed in a state of being relatively time-divided, and sent as a double pulse to the sender 40 through the transmission line 60.

After passing along the transmission line 60, the double pulse enters the sender 40. The sender 40 is provided with an optical attenuator 401, a polarization beam splitter 402, a MZ modulator 403, a MZ modulator driver 404, and a controller 405. However, the provision of the optical attenuator 401 depends on need and is not always necessary. Moreover, the polarization beam splitter 402 and MZ modulator 403 constitute a polarization beam splitter (PBS) loop, which is a loop-back means for exhibiting to an optical pulse characteristics equivalent to the reflection characteristics of a Faraday mirror.

The MZ modulator driver 404 generates driving signals RF1 and RF2 by using four random numbers Rnd1 to Rnd4 supplied from the controller 405 and applies them to the MZ modulator 403. In addition, the controller 405 outputs an offset signal δV to the MZ modulator driver 404.

Each pulse of the double pulse received from the receiver 50 is split by the polarization beam splitter 402 in accordance with the polarization state and is subjected to intensity modulation and phase modulation at the MZ modulator 403 while going round the PBS loop. The pulses going round the PBS loop are combined again by the polarization beam splitter 402 and sent out to the receiver 50 through the transmission line 60, as a returning double pulse. The polarizations of the optical pulses are rotated by 90 degrees each, by their going round the PBS loop, and in these respective polarization states, the optical pulses are sent out to the transmission line 60. Accordingly, when the double pulse arrives at the receiver 50 after passing along the transmission line 60, since the polarizations of the double pulse have been rotated by 90 degrees from those at the time of outward journey, the polarization beam splitter 505 outputs each of the optical pulses to one of the paths that is different from the path on the outward journey. Consequently, the two optical pulses, obtained by one optical pulse being split by the optical coupler 503 when sent out to the sender 40, both travel along the same-length paths, during which the double pulse is sent out from the receiver 50, reflected at the sender 40, and returned again to the receiver 50. The optical pulses are then combined again by the optical coupler 503, whereby interference occurs. The optical pulse in a single-photon state after the interference is detected by using balanced gated-mode photon detectors APD0 and APD1.

2.2) Phase Modulation at PBS Loop

Figure 10:
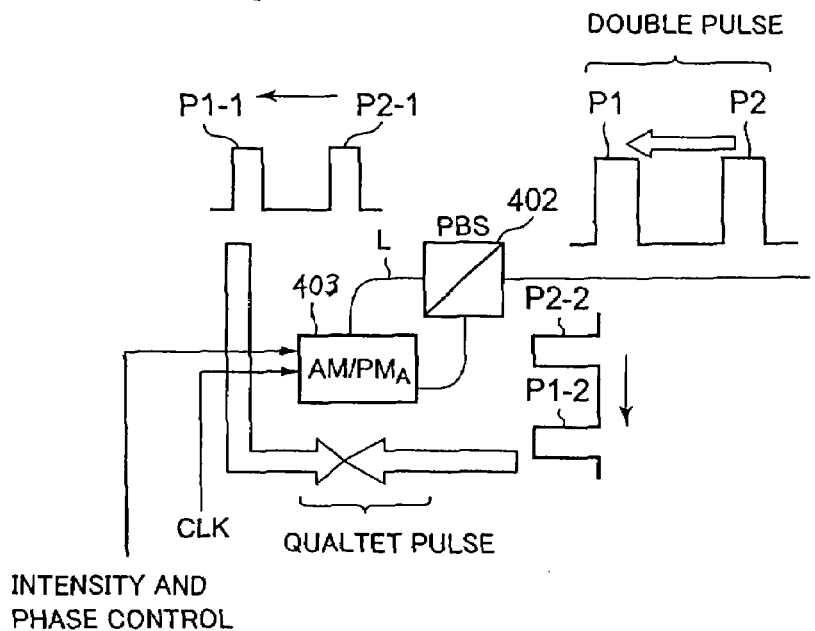
FIG. 10 is a schematic diagram for describing the operation of a PBS loop in a sender.

FIG. 10 is a schematic diagram for describing the operation of the PBS loop in the sender 40. As described above, the pulses P1 and P2 of a double pulse received from the receiver 50 are each split into orthogonal polarization components by the polarization beam splitter 402, resulting in four pulses (quartet pulses) P1-1, P1-2, P2-1, and P2-2. The optical pulses P1-1 and P1-2 correspond to one polarization component and its orthogonal polarization component of the optical pulse P1, respectively, and the optical pulses P2-1 and P2-2 correspond to one polarization component and its orthogonal polarization component of the optical pulse P2, respectively.

Two loop-side ports of the polarization beam splitter 402 are respectively connected to two optical ports of the MZ modulator 403 through polarization-maintaining optical fiber. However, the respective optical lines between the ports have different lengths. Here, it is assumed that the lengths of the optical lines are set so that the optical pulses P1-1 and P2-1 enter the MZ modulator 403 earlier than the optical pulses P1-2 and P2-2, respectively, by a time difference T each. This time difference T is set longer than the width of an optical pulse and shorter than the interval between the pulses P1 and P2 of the double pulse.

Figure 11:
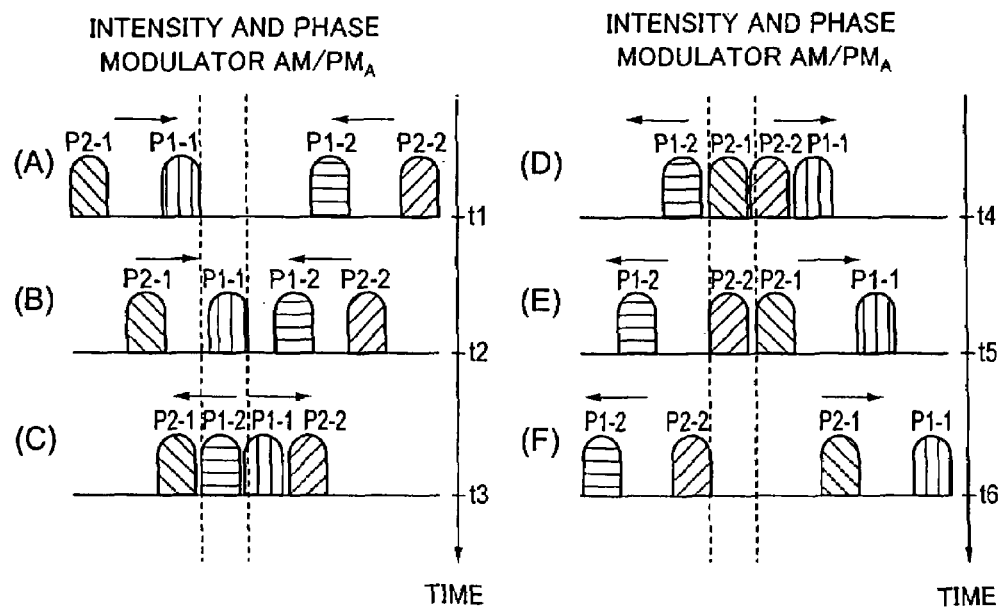
FIG. 11 is an explanatory diagram showing the temporal order of optical pulses propagating through a MZ modulator.

FIG. 11 is an explanatory diagram showing the temporal order of the optical pulses propagating through the MZ modulator. Since the optical pulses P1-1 and P2-1 arrive at the MZ modulator 403 earlier than the optical pulses P1-2 and P2-2, respectively, by the time difference T each, the optical pulses pass through the MZ modulator 403 at different times t2, t3, t4, and t5 as shown in FIGS. 11(B) to 11(E). Therefore, the driving signals RF1 and RF2 to be applied to the MZ modulator 403 are changed in value in synchronization with the intervals between the pulses, whereby varying intensity differences and/or phase differences can be given between the pulses.

2.3) MZ Modulator Driver

Figures 12A, 12B:
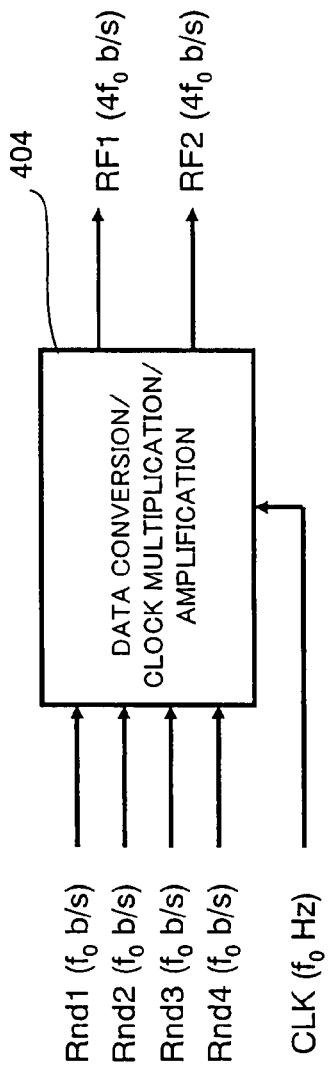
FIG. 12A is a block diagram for describing the operation of a driver for generating driving signals (RF1, RF2) for driving a MZ modulator.
FIG. 12B is a table of correspondences for the levels of the signals (RF1, RF2).
Figure 13:
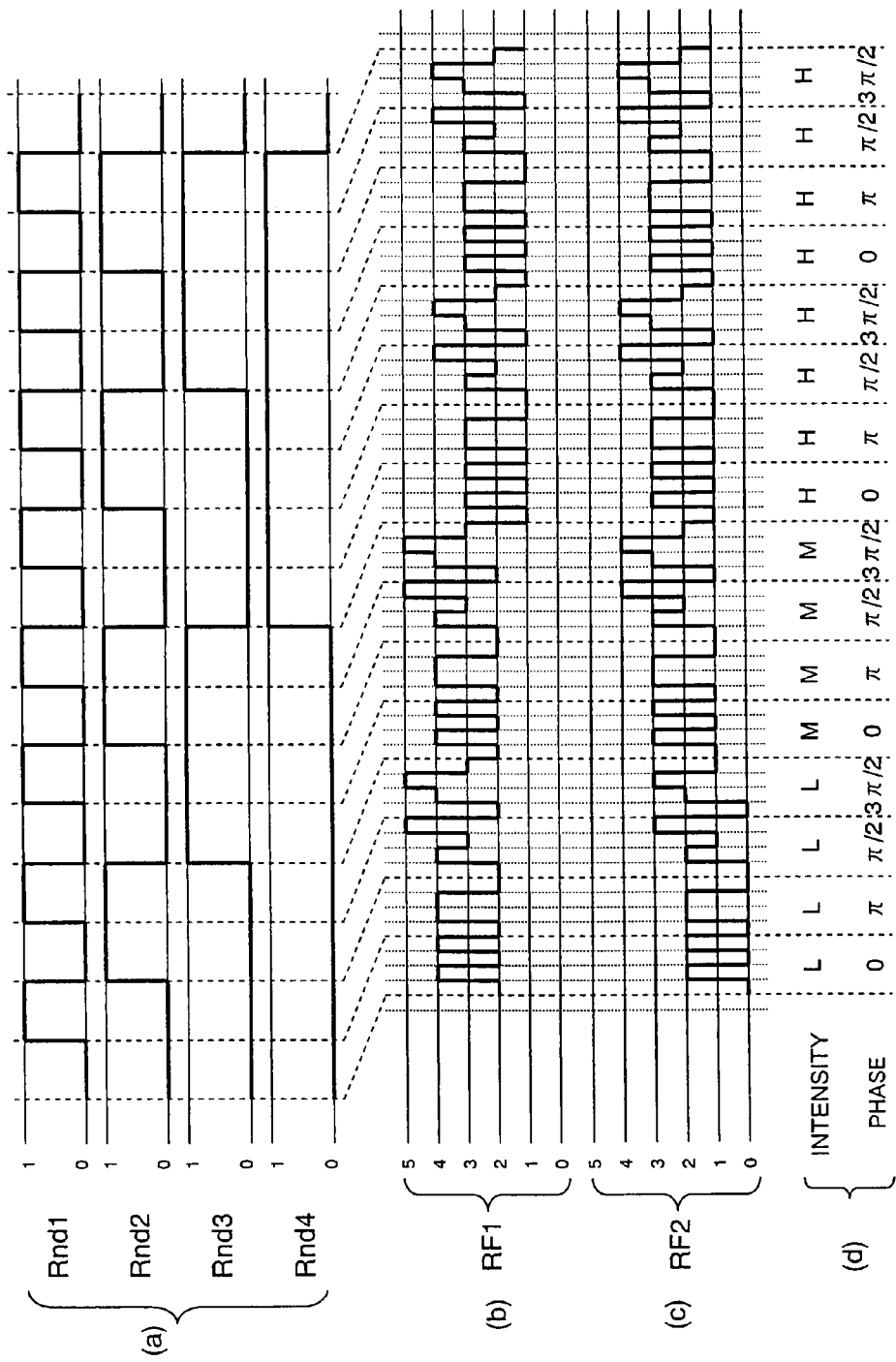
FIG. 13 is a waveform diagram conceptually showing signal conversion from random number inputs (Rnd1, Rnd2, Rnd3, Rnd4) to outputs (RF1, RF2).

FIG. 12A is a block diagram for describing the operation of the driver 404 for generating the driving signals RF1 and RF2 for driving the MZ modulator 403, and FIG. 12B is a table of correspondences for the levels of the driving signals RF1 and RF2. FIG. 13 is a waveform diagram conceptually showing signal conversion from random-number inputs (Rnd1, Rnd2, Rnd3, Rnd4) to the output signals RF1 and RF2.

The driver 404 has functions of data conversion, clock multiplication, and amplification and generates two signals RF1 and RF2 (4 $f_0$ b/s) from four random-number inputs Rnd1, Rnd2, Rnd3, and Rnd4 ($f_0$ b/s) and a clock signal CLK ($f_0$ Hz). Here, as shown in FIG. 12B, each of the two output signals RF1 and RF2 is a signal having six levels of intensity, and the frequency of the output signals is four times higher than that of the input signals. Therefore, for a one-bit input, four bits are outputted each in a ¼ time range (T1, T2, T3, T4), and the time ranges T1, T2, T3, and T4 correspond to FIGS. 11(B) to 11(E), respectively. Here, it is assumed that the voltage difference between each adjacent level of the six-level intensity signal is $V_{90}/2$.

4.4) Operation

The two-way QKD system according to the present embodiment uses the most typical QKD algorithm called BB84 protocol. The sender (Alice) 40 is provided with four random number sources. A random number Rnd1 supplies "0" or "1" for cryptographic key data, and a random number Rnd2 determines the way of data coding. In a QKD method utilizing the phase of an optical pulse, a random number Rnd2 selects one of two coding sets (bases): one coding set of a 0-phase representing cryptographic key data "0" and a π-phase representing cryptographic key data "1" (hereinafter, this coding set will be referred to as "+basis"), and the other coding set of a π/2-phase representing cryptographic key data "0" and a 3π/2-phase representing cryptographic key data "1" (hereinafter, this coding set will be referred to as "xbasis"). That is, any one of four types of modulation (0, π/2, π, 3π/2) is randomly performed on an optical pulse.

Further, random numbers Rnd3 and Rnd4 are used as the random numbers for decoy intensity modulation. Referring to the table of level correspondences of FIG. 12B, it can be seen that when a random number Rnd4 is "1", the signals RF1 and RF2 are determined only by the values of random numbers Rnd1 and Rnd2, irrespective of the value of a random number Rnd3. Specifically, the signals RF1 and RF2 have sequential levels of (1, 3, 1, 3) when (Rnd1, Rnd2)=(0, 0), sequential levels of (1, 3, 3, 1) when (Rnd1, Rnd2)=(1, 0), sequential levels of (1, 3, 2, 4) when (Rnd1, Rnd2)=(0, 1), and sequential levels of (1, 3, 4, 2) when (Rnd1, Rnd2)=(1, 1). Note that since the signals RF1 and RF2 are the same signals when a random number Rnd4 is "1", the optical pulses passing through the MZ modulator 403 are only subjected to phase modulation.

On the other hand, when a random number Rnd4 is "0" and a random number Rnd3 is "0", the levels of the signal RF1 are shifted by +1 and the levels of the signal RF2 are shifted by −1 from their respective signal levels when a random number Rnd4 is "1". With the fact in mind that the voltage difference between adjacent levels of an output signal is $V_\pi/2$, the optical pulses passing though the MZ modulator 403 are subjected to phase modulation and also subjected to such intensity modulation that the optical intensity is reduced to a low level equivalent to the value α set in the offset signal δV, as described in FIG. 8.

Lastly, when a random number Rnd4 is "0" and a random number Rnd3 is "1", the levels of the signal RF1 are shifted by +1 and the levels of the signal RF2 are unchanged, compared with their respective signal levels when a random number Rnd4 is "1". In this case, although the case described in FIG. 8 does not apply, the relative voltage difference between the signals RF1 and RF2 is $V_\pi/2$, and therefore the optical intensity is reduced by half.

Thus, based on the respective voltages of the signals RF1 and RF2 as well as the relative voltage difference between them, multilevel-modulated optical outputs having three values for intensity and four values for phase can be obtained as shown in FIG. 13(d). The thus multilevel-modulated double pulse is sent to the receiver (Bob) 50 through the transmission line 60.

On the other hand, the receiver (Bob) 50 has a random number source for random numbers Rnd5 that correspond to the bases. The controller 506 drives the phase modulator 504 with a random number Rnd5 so that an optical pulse sent from the sender (Alice) 40 is decoded. When the value of a random number Rnd5 is "0", 0-phase (+basis) modulation is performed on an optical pulse. When the value of a random number Rnd5 is "1", π/2-phase (xbasis) modulation is performed on an optical pulse.

Thereafter, the optical pulses interfere at the optical coupler 503, and the data thus obtained by the photon detector APD0 or APD1 is set as a random number Rnd6. If the bases used in modulation by the sender (Alice) 40 and the receiver (Bob) 50 are the same (i.e. Rnd2=Rnd5), the receiver (Bob) 50 successfully detects the value of the corresponding random number Rnd1 that is cryptographic key data chosen by the sender (Alice) 40, which means Rnd1=Rnd6. On the other hand, when the bases on the sender side and on the receiver side are different (i.e., Rnd2≠Rnd5), the receiver (Bob) 50 randomly obtains a value of "0" or "1", as a random number Rnd6, irrespective of the value of the corresponding random number Rnd1. Since each of the random numbers Rnd1, Rnd2, and Rnd5 varies with each one bit, the probability that the bases match and the probability that the bases do not match are both 50%. Nonetheless, the bits corresponding to non-matching bases are discarded through basis reconciliation at a later stage, whereby the sender (Alice) 40 and the receiver (Bob) 50 can share a bit string of "0"s and "1"s corresponding to random numbers Rnd1 (see Bennett and Brassard, "Quantum Cryptography: Public Key Distribution and Coin Tossing," Proceedings of IEEE International Conference on Computers, Systems, and Signal Processing, Bangalore, India, Dec. 10-12, 1984, p. 175).

As described above, by driving the MZ modulator with the multilevel modulation signals RF1 and RF2 as shown in FIGS. 12A, 12B and 13, it is possible to perform optical intensity modulation with three values here, in addition to phase modulation.

Figure 14:
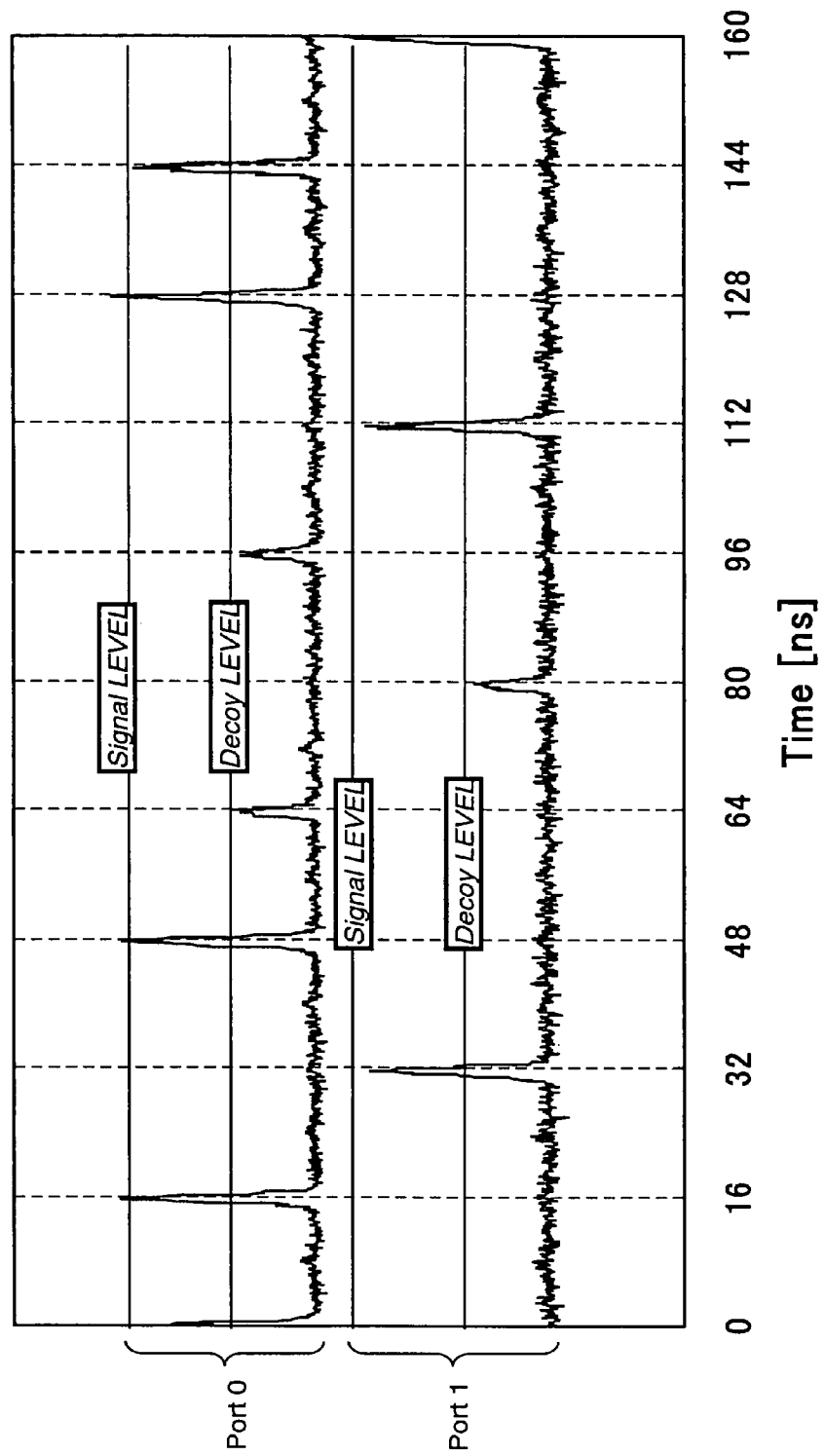
FIG. 14 is a graph showing output results of a receiver-side interferometer when two-level optical intensity modulation is additionally performed in quantum key distribution that uses phase modulation.

FIG. 14 is a graph showing output results of a receiver-side interferometer in the case where optical intensity modulation with two values was additionally performed in quantum key distribution utilizing phase modulation. In this example, an experimental system as shown in FIG. 9 was used, and modulation using two values for phase and two values for intensity was performed in the sender (Alice) 40. Here, the two ports for the outputs of the interferometer are denoted by Port0 (on the APD0 side) and Port1 (on the APD1 side). The graph of FIG. 14 shows the results when the optical pulse repetition rate is 62.5 Hz. From this graph, It can be seen that the output optical intensity was greatly reduced at times 64, 80, and 96 (ns) in comparison with the intensity at the other times. This level of intensity at the times 64, 80, and 96 is decoy level. Accordingly, it can be confirmed that it is possible to modulate the phase and intensity of an optical pulse at the same time through the present scheme.

2.5) Advantages

The following effects can be obtained according to the first embodiment described above. First, since a MZ modulator can be driven at far higher frequency than a variable optical attenuator, the limit to the cryptographic key generation rate, imposed due to the band of an optics component in use, can be greatly enhanced.

Moreover, if a variable optical attenuator is provided in addition to a phase modulator, it is necessary to vary the timings when a train of optical pulses pass through these two devices on the outward and return journeys. This necessity makes the timing design complicated, imposing a limit to the QKD system driving rate.

On the other hand, according to the present embodiment, intensity modulation, as well as four-state phase modulation, can be realized by one MZ modulator. Accordingly, since the timing should be considered for only one device, the timing design is facilitated, and at the same time, the QKD system driving rate can also be greatly enhanced. In addition, since the number of devices in use is reduced, the optical loss is also reduced, and the configuration is also simplified.

Figure 1:
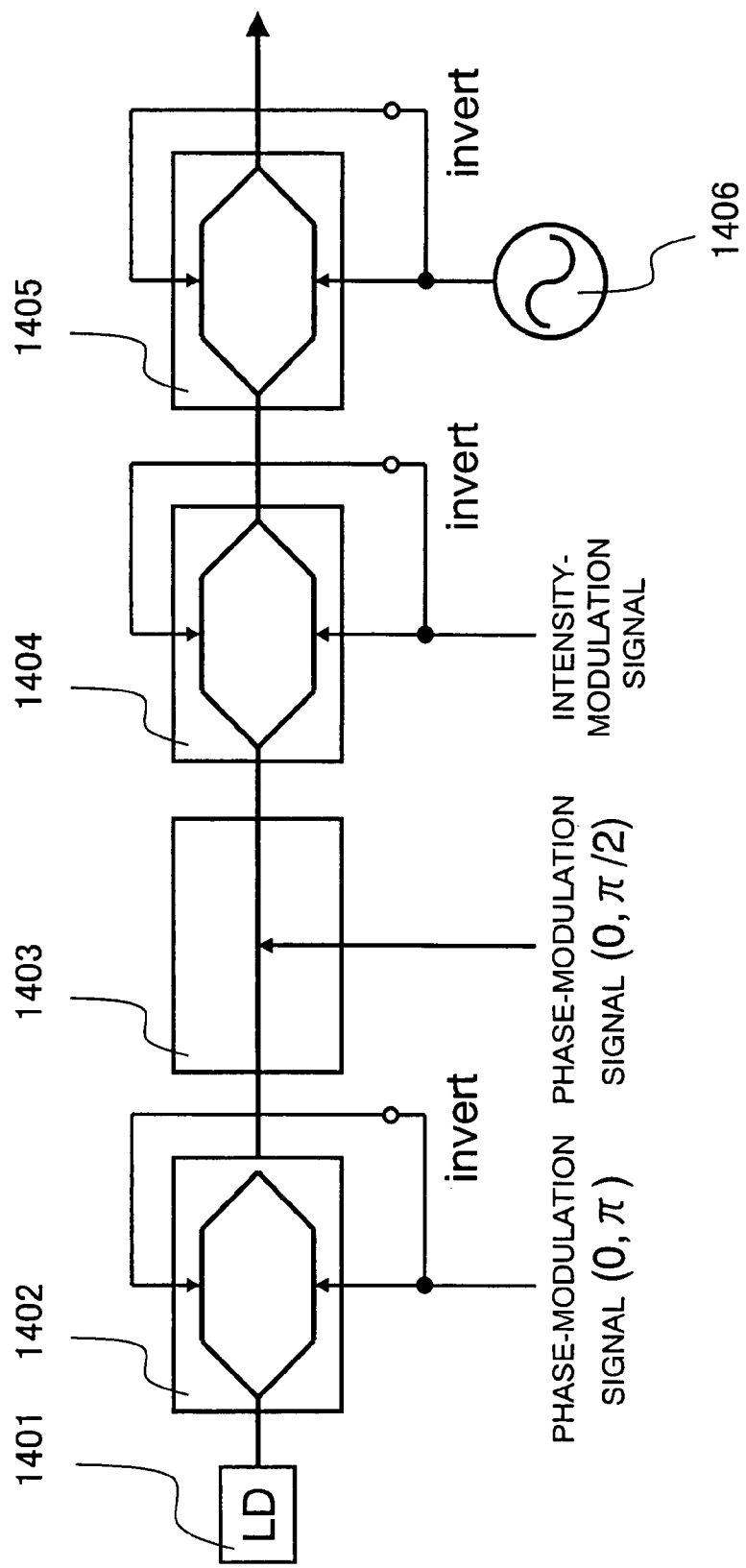
FIG. 1 is a block diagram showing a schematic configuration of a sender that generates an APSK signal, described in Hayase et al.
Figure 2:
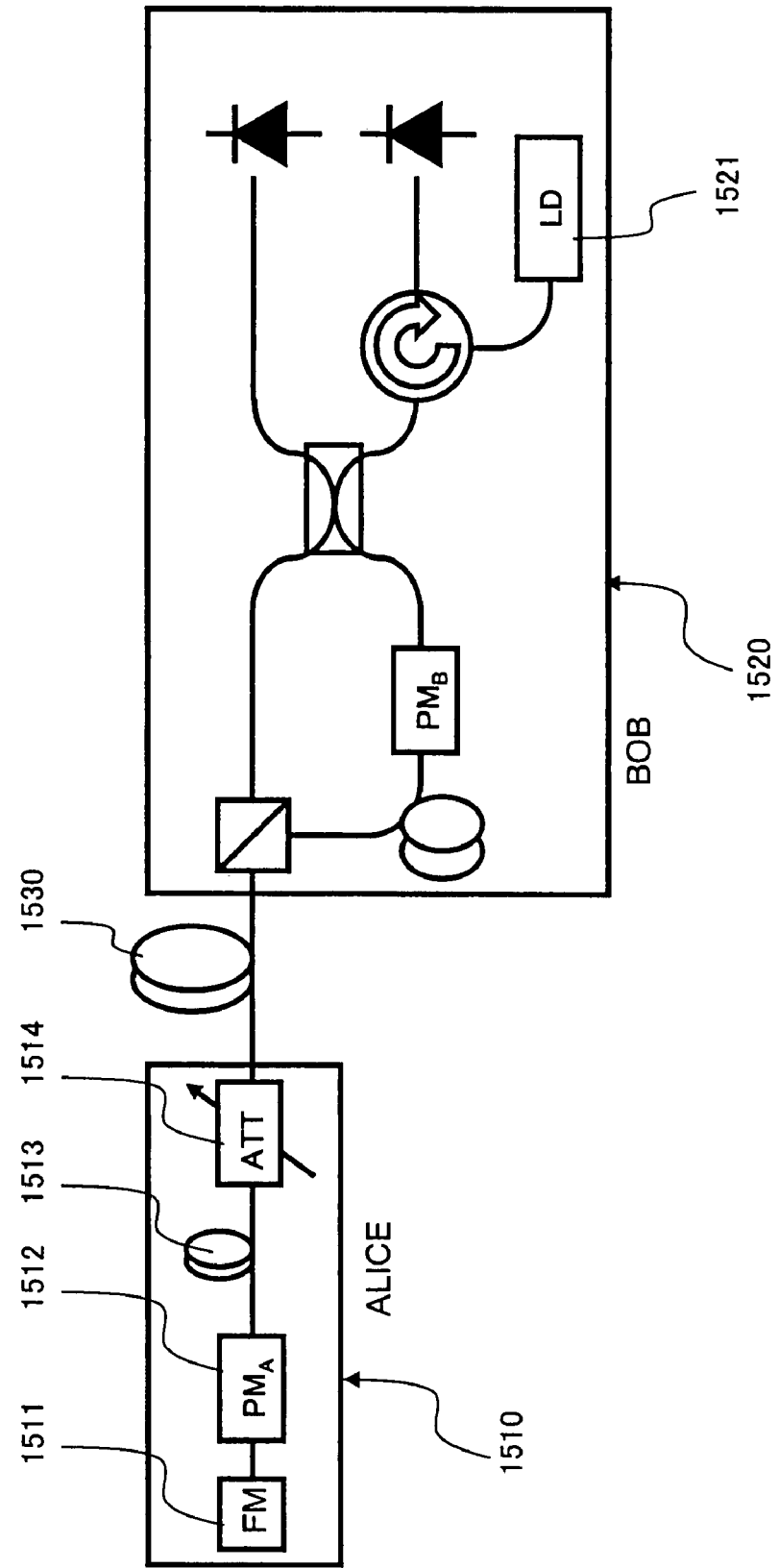
FIG. 2 is a block diagram showing a schematic configuration of a two-way QKD system described in Zhao et al.

Note that the present invention is not limited to this embodiment. The present invention can also be applied to a general plug and play scheme using a Faraday mirror as shown in FIG. 2. Moreover, the QKD algorithm is not limited to the BB84 protocol either. The present invention can also be applied to the E91 protocol, the B92 protocol, and a method of coding information on a differential phase shift. Furthermore, although an example of the decoy scheme in which the optical intensity is varied at three levels is shown in the present embodiment, the number of multiple levels for optical intensity is not limited to three. Levels (values) of optical intensity to be set are not limited to those described in the present embodiment either.

3. Second Embodiment

The present invention can be applied not only to two-way quantum key distribution systems but also to one-way systems.

Figure 15:
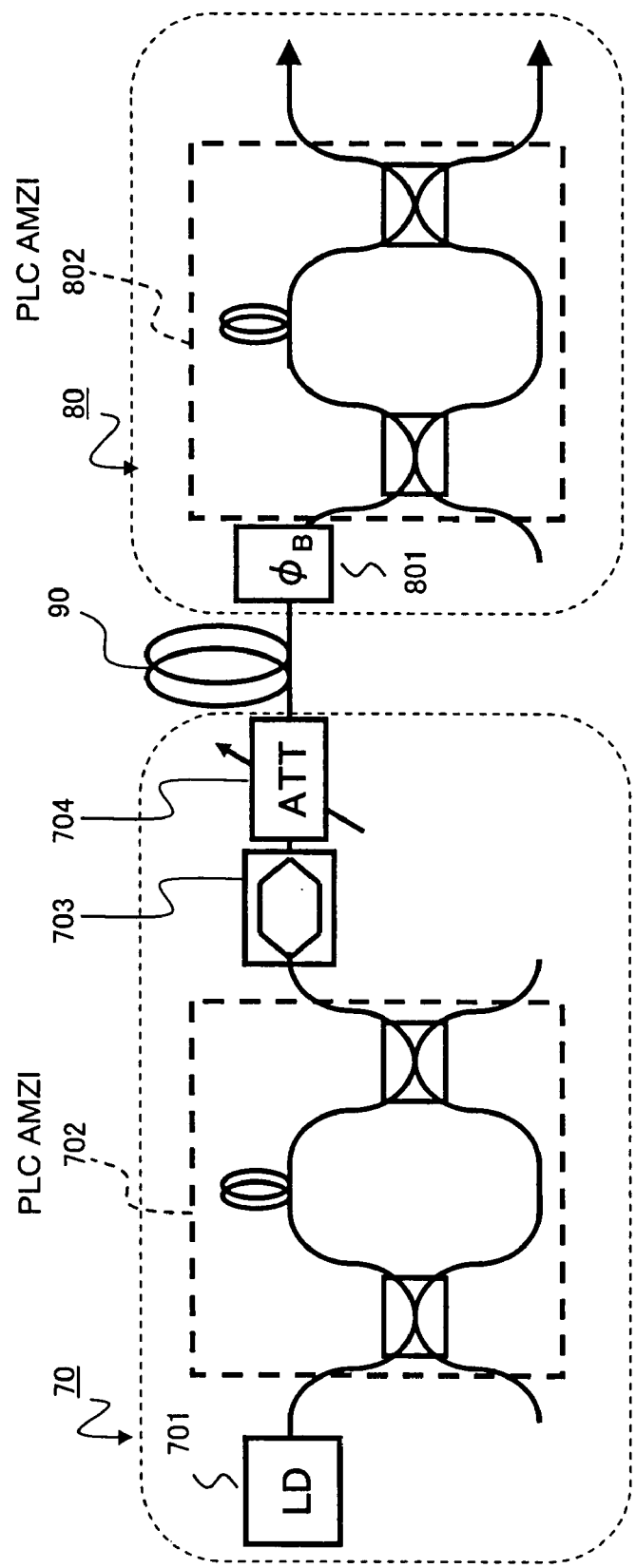
FIG. 15 is a block diagram showing a schematic configuration of a one-way QKD system according to a second embodiment of the present invention.

FIG. 15 is a block diagram showing a schematic configuration of a one-way QKD system according to a second embodiment of the present invention. The present embodiment is a one-way QKD system using the planar lightwave circuit (PLC) described in Nambu, Y., et al., "One-way Quantum Key Distribution System based on Planar Lightwave Circuits," quant-ph/0603041, to which the present invention is applied. A sender or transmitter (Alice) 70 and a receiver (Bob) 80 are connected through optical fiber 90 and each have an interferometer for time-delayed pulses, structured by using an asymmetric Mach-Zehnder interferometer (AMZI) based on PLC technology.

The sender 70 has a pulse light source 701, an asymmetric Mach-Zehnder interferometer 702 based on a planar lightwave circuit, a MZ modulator 703 capable of intensity modulation and phase modulation, and a variable optical attenuator 704 that is provided as needed, as well as a synchronization section, a driver for driving the MZ modulator 703, a controller, and the like (not shown). The receiver 80 has a phase modulator 801, and an asymmetric Mach-Zehnder interferometer 802 based on a planar lightwave circuit, as well as a synchronization section, photon detectors, a controller, and the like (not shown).

An optical pulse outputted from the pulse light source 701 of the sender 70 is split into two time-divided optical pulses (double pulse) by the asymmetric Mach-Zehnder interferometer 702, subjected to intensity modulation and/or phase modulation as described already at the MZ modulator 703, and then sent out to the receiver 80 through the variable optical attenuator 704.

In the receiver 80, the arriving first and second optical pulses of the double pulse are subjected to phase modulation at the phase modulator 801, and each is further split by the asymmetric Mach-Zehnder interferometer 802, where the following one of the separate first pulses and the preceding one of the separate second pulses interfere with each other. The result of this interference is detected by one of the photon detectors. For the QKD algorithm, any of the BB84, E91, B92, and other protocols can be used. This embodiment can also be applied to a method of coding information on a differential phase shift.

As described above, in the one-way QKD system as well, it is possible to perform both intensity modulation and phase modulation by using the single MZ modulator 703. Accordingly, it is possible to implement a decoy QKD system with a simple configuration and small optical loss.

The present invention can be applied to general optical communications systems using the amplitude phase shift keying (APSK) scheme. As to the APSK signal, it is of no significance how many levels are set for the signal and whether the signal is subjected to RZ modulation or NRZ modulation. Further, the present invention can be utilized in the technologies for generating random numbers by the detection of single photons, which are typified by the quantum key distribution technology that performs cryptographic key distribution by superposing information on the quantum states of single photons.

The invention claimed is:

1. An optical communication device for sequentially transmitting a plurality of optical pulses to another optical communication device, wherein the plurality of optical pulses are modulated in both phase and intensity, comprising:
    an optical modulator having an interferometer structure which includes a plurality of optical waveguides and electrodes each corresponding to the waveguides, wherein the optical modulator allows both phase and intensity of each optical pulse to be modulated at the same time according to driving signals each applied to the electrodes; and
    a driver for driving the optical modulator by generating the driving signals from modulation information for separately modulating the phase and the intensity of each optical pulse; and
    a loop-back section for receiving each optical pulse from said another optical communication device and returning each modulated optical pulse to said another optical communication device, wherein the optical modulator is provided at a predetermined position on an optical path in the loop-back section, each optical pulse passing through the optical modulator in opposite directions,
    wherein the optical modulator modulates the intensity of each optical pulse, the intensity being selected from a plurality of intensity levels including a very weak level.

2. The optical communication device according to claim 1, wherein the intensity of each optical pulse is randomly changed depending on the modulation information modulating the intensity of the optical pulse.

3. The optical communication device according to claim 1, wherein the driver generates the driving signals according to first information which causes the phase of each optical pulse to be modulated and second information which causes the intensity of the optical pulse to be modulated, wherein the first information is multi-valued information corresponding to a plurality of phases and the second information is multi-valued information corresponding to a plurality of intensities.

4. The optical communication device according to claim 1, wherein the driver sets an intensity ratio for intensity modulation by offset adjustment of at lease one of the driving signals.

5. The optical communication device according to claim 1, wherein the loop-back section includes a Faraday mirror.

6. The optical communication device according to claim 1, wherein the loop-back section includes a polarization beam splitter loop on which the optical modulator is provided.

7. The optical communication device according to claim 1, wherein the optical modulator is a dual-electrode Mach-Zehnder modulator, wherein the driver comprises:
    a first digital-to-analog converter for generating a first modulation signal from binary phase-modulation information inputted as MSB (Most Significant Bit) and inverted one of binary intensity modulation information inputted as LSB (Least Significant Bit);
    a second digital-to-analog converter for generating a second modulation signal from the binary phase-modulation information inputted as MSB (Most Significant Bit) and the binary intensity modulation information inputted as LSB (Least Significant Bit);
    a first amplifier for amplifying the first modulation signal;
    a second amplifier for amplifying the second modulation signal; and
    an adder for adding a predetermined offset signal to an output signal of the second amplifier,
    wherein an output signal of the first amplifier is applied as a first driving signal to one electrode of the dual-electrode Mach-Zehnder modulator and an output signal of the adder is applied as a second driving signal to the other electrode of the dual-electrode Mach-Zehnder modulator.

8. The optical communication device according to claim 7, wherein the first and second amplifiers amplify the first and second modulation signals respectively so that a voltage difference between adjacent levels of the output signals of the first and second amplifiers becomes equal to a level that is half a driving voltage $V_\pi$ of the dual-electrode Mach-Zehnder modulator.

9. The optical communication device according to claim 7, wherein the predetermined offset signal causes the output signal of the second amplifier to deviate from half the driving voltage $V_\pi$ by a predetermined voltage.

10. A quantum key distribution system for sharing a string of random numbers between a sender and a receiver while changing a mean number of photons of a plurality of optical pulses transmitted from the sender to the receiver, wherein the sender comprises:
    an optical modulator having an interferometer structure which includes a plurality of optical waveguides and electrodes each corresponding to the waveguides, wherein the optical modulator allows both phase and the mean number of photons of each optical pulse to be modulated at the same time according to driving signals each applied to the electrodes; and
    a driver for driving the optical modulator by generating the driving signals from modulation information for separately modulating the phase and the mean number of photons of each optical pulse and;
    a loop-back section for receiving each optical pulse from the receiver and returning each modulated optical pulse to the receiver, wherein the optical modulator is provided at a predetermined position on an optical path in the loop-back section, each optical pulse passing though the optical modulator in opposite directions,
    wherein the optical modulator modulates the mean number of photons of each optical pulse, the mean number being selected from a plurality of mean numbers of photons including a very small number of photons for a very weak level.

11. The quantum key distribution system according to claim 10, wherein the modulation information is a string of random numbers.

12. The quantum key distribution system according to claim 10, wherein the driver generates the driving signals according to first information which causes the phase of each optical pulse to be modulated and second information which causes the mean number of photons of the optical pulse to be modulated, wherein the first information is multi-valued information corresponding to a plurality of phases and the second information is multi-valued information corresponding to a plurality of mean numbers of photons.

13. The quantum key distribution system according to claim 10, wherein the driver sets a ratio of the modulated mean numbers of photons by offset adjustment of at lease one of the driving signals.

14. The quantum key distribution system according to claim 10, wherein the loop-back section includes a Faraday mirror.

15. The quantum key distribution system according to claim 10, wherein the loop-back section includes a polarization beam splitter loop into which the optical modulator is inserted.

16. The quantum key distribution system according to claim 10, wherein the optical modulator is a dual-electrode Mach-Zehnder modulator.

17. An optical communication method through an optical communication device, for sequentially transmitting a plurality of optical pulses to another optical communication device, wherein the plurality of optical pulses are modulated in both phase and intensity by an optical modulator having an interferometer structure which includes a plurality of optical waveguides and electrodes each corresponding to the waveguides, the method comprising:
receiving each optical pulse from said another optical communication device;
generating driving signals from modulation information for separately modulating the phase and the intensity of each optical pulse;
applying the driving signals to the electrodes of the optical modulator so as to modulate both phase and intensity of each optical pulse at the same time, wherein the driving signals are generated such that a plurality of intensity levels among which the optical modulator modulates the intensity of each optical pulse includes a very weak level; and
returning each modulated optical pulse to said another communication device, wherein the optical modulator is provided at a predetermined position on a loop-back optical path, each optical pulse passing through the optical modulator in opposite directions.

18. The optical communication method according to claim 17, wherein the intensity of each optical pulse is randomly changed depending on the modulation information modulating the intensity of the optical pulse.

19. The optical communication method according to claim 17, wherein the driving signals comprises first information which causes the phase of each optical pulse to be modulated and second information which causes the intensity of the optical pulse to be modulated, wherein the first information is multi-valued information corresponding to a plurality of phases and the second information is multi-valued information corresponding to a plurality of intensities.

20. The optical communication method according to claim 17, wherein an intensity ratio for intensity modulation is set by offset adjustment of at lease one of the driving signals.

21. The optical communication method according to claim 17, wherein the optical pulse is returned by a Faraday mirror.

22. The optical communication method according to claim 17, wherein the optical pulse is returned by a polarization beam splitter loop on which the optical modulator is provided.

23. The optical communication method according to claim 17, wherein the optical modulator is a dual-electrode Mach-Zehnder modulator, wherein the driving signals are generated by:
generating a first modulation signal from binary phase-modulation information inputted as MSB (Most Significant Bit) and inverted one of binary intensity modulation information inputted as LSB (Least Significant Bit);
generating a second modulation signal from the binary phase-modulation information inputted as MSB (Most Significant Bit) and the binary intensity modulation information inputted as LSB (Least Significant Bit);
amplifying the first modulation signal and the second modulation signal; and
adding a predetermined offset signal to an output signal of the second amplifier,
wherein an amplified signal of the first modulation signal is applied as a first driving signal to one electrode of the dual-electrode Mach-Zehnder modulator and a sum signal obtained by the addition is applied as a second driving signal to the other electrode of the dual-electrode Mach-Zehnder modulator.

24. The optical communication method according to claim 23, wherein the first and second modulation signals are amplified so that a voltage difference between adjacent levels of amplified signals obtained by amplifying the first and second modulation signals becomes equal to a level that is half a driving voltage $V_\pi$ of the dual-electrode Mach-Zehnder modulator.

25. The optical communication method according to claim 23, wherein the predetermined offset signal causes the amplified signal obtained by amplifying the second modulation signal to deviate from half the driving voltage $V_\pi$ by a predetermined voltage.

26. A quantum key distribution method for sharing a string of random numbers between a sender and a receiver while changing a mean number of photons of a plurality of optical pulses transmitted from the sender to the receiver, wherein the sender comprises an optical modulator having an interferometer structure which includes a plurality of optical waveguides and electrodes each corresponding to the waveguides, the method comprising:
receiving each optical pulse from said receiver;
generating driving signals from modulation information for separately modulating the phase and the mean number of photons of each optical pulse;
applying the driving signals to the electrodes of the optical modulator so as to modulate both phase and the mean number of photons of each optical pulse at the same time, wherein the driving signals are generated such that the mean number of photons of each optical pulse among a plurality of mean numbers of photons includes a very small number of photons for a very weak level; and
returning each modulated optical pulse to said receiver, wherein the optical modulator is provided at a predetermined position on a loop-back optical path, each optical pulse passing through the optical modulator in opposite directions.

27. The quantum key distribution method according to claim 26, wherein the modulation information is a string of random numbers.

28. The quantum key distribution method according to claim 26, wherein the driving signals are generated according to a string of first random numbers which causes the phase of each optical pulse to be modulated and a string of second random numbers which causes the mean number of photons of the optical pulse to be modulated, wherein the string of the first random numbers corresponds to a plurality of phases and the string of the second random numbers is corresponds to a plurality of mean numbers of photons.

29. The quantum key distribution method according to claim 26, wherein a ratio of the modulated mean numbers of photons is set by offset adjustment of at lease one of the driving signals.

30. A computer readable storage device having stored thereon computer executable instructions that when executed by a processor of a computer control the computer to implement an optical communication method in an optical communication device, for sequentially transmitting a plurality of optical pulses to another optical communication device, wherein the optical pulses are modulated in both phase and intensity by an optical modulator having an interferometer structure which includes a plurality of optical waveguides and electrodes each corresponding to the waveguides, the optical communication method comprising:

receiving each optical pulse from said another optical communication device;

generating driving signals from modulation information for separately modulating the phase and the intensity each optical pulse;

plying the driving signals to the electrodes of the optical modulator so as to modulate both phase and intensity of each optical pulse at the same time, wherein the driving signals are generated such that a plurality of intensity levels among which the optical modulator modulates the intensity of each optical pulse includes a very weak level; and returning each modulated optical pulse to said another communication device, wherein the optical modulator is provided at a predetermined position on a loop-back optical path, each optical pulse passing through the optical modulator in opposite directions.

* * * * *